United States Patent
Tsukazaki et al.

(10) Patent No.: US 10,982,753 B2
(45) Date of Patent: Apr. 20, 2021

(54) SHIFTING DEVICE

(71) Applicant: U-SHIN LTD., Tokyo (JP)

(72) Inventors: Manabu Tsukazaki, Hiroshima (JP); Ippei Makio, Hiroshima (JP)

(73) Assignee: U-SHIN LTD, Tokyo (JP)

( * ) Notice: Subject to any disclaimer, the term of this patent is extended or adjusted under 35 U.S.C. 154(b) by 137 days.

(21) Appl. No.: 16/454,205

(22) Filed: Jun. 27, 2019

(65) Prior Publication Data

US 2019/0316673 A1 Oct. 17, 2019

Related U.S. Application Data

(62) Division of application No. 14/921,552, filed on Oct. 23, 2015, now abandoned.

(30) Foreign Application Priority Data

Oct. 29, 2014 (JP) .............................. JP2014-220808
Sep. 3, 2015 (JP) .............................. JP2015-173698

(51) Int. Cl.
*F16H 59/02* (2006.01)
*F16H 59/10* (2006.01)

(52) U.S. Cl.
CPC ....... F16H 59/105 (2013.01); F16H 59/0204 (2013.01); F16H 59/0213 (2013.01); *F16H 2059/0269* (2013.01)

(58) Field of Classification Search
CPC .. F16H 59/02; F16H 59/0204; F16H 59/0213; F16H 59/105; F16H 2059/0269; F16H 61/18

See application file for complete search history.

(56) References Cited

U.S. PATENT DOCUMENTS

| | | | |
|---|---|---|---|
| 3,323,386 | A | 6/1967 | Musick et al. |
| 4,519,266 | A | 5/1985 | Reinecke |
| 6,415,677 | B1 | 7/2002 | Skogward |
| 7,219,572 | B2 | 5/2007 | Syamoto |
| 8,333,128 | B2 | 12/2012 | Schober et al. |
| 8,400,342 | B2 | 3/2013 | Zimmerman et al. |
| 2014/0033849 | A1 | 2/2014 | Yamamoto et al. |

FOREIGN PATENT DOCUMENTS

| | | |
|---|---|---|
| CN | 1605492 | 4/2005 |
| CN | 104061323 | 9/2014 |
| JP | 2007062664 | 3/2007 |
| JP | 3996380 | 10/2007 |
| JP | 2014184772 | 10/2014 |

OTHER PUBLICATIONS

Japanese Patent Office, "Notice of Reasons for Refusal", dated Jun. 4, 2019.

*Primary Examiner* — William C Joyce
(74) *Attorney, Agent, or Firm* — BainwoodHuang

(57) ABSTRACT

A shifting device shifting device includes a rotor member pivotally-supported by a base member in a turnable manner, and configured to turn following a shifting direction of a shift lever; a lever member pivotally-supported by the base member in a turnable manner, and configured to turn following a selecting direction of the shift lever; a hall sensor as a detector member mounted on a circuit board and facing against a detection target section of the rotor member; and a hall sensor mounted on a surface of the circuit board, and facing against a detection target section of the lever member, the surface being identical to a surface on which the hall sensor is mounted.

4 Claims, 39 Drawing Sheets

SHIFTING DIRECTION

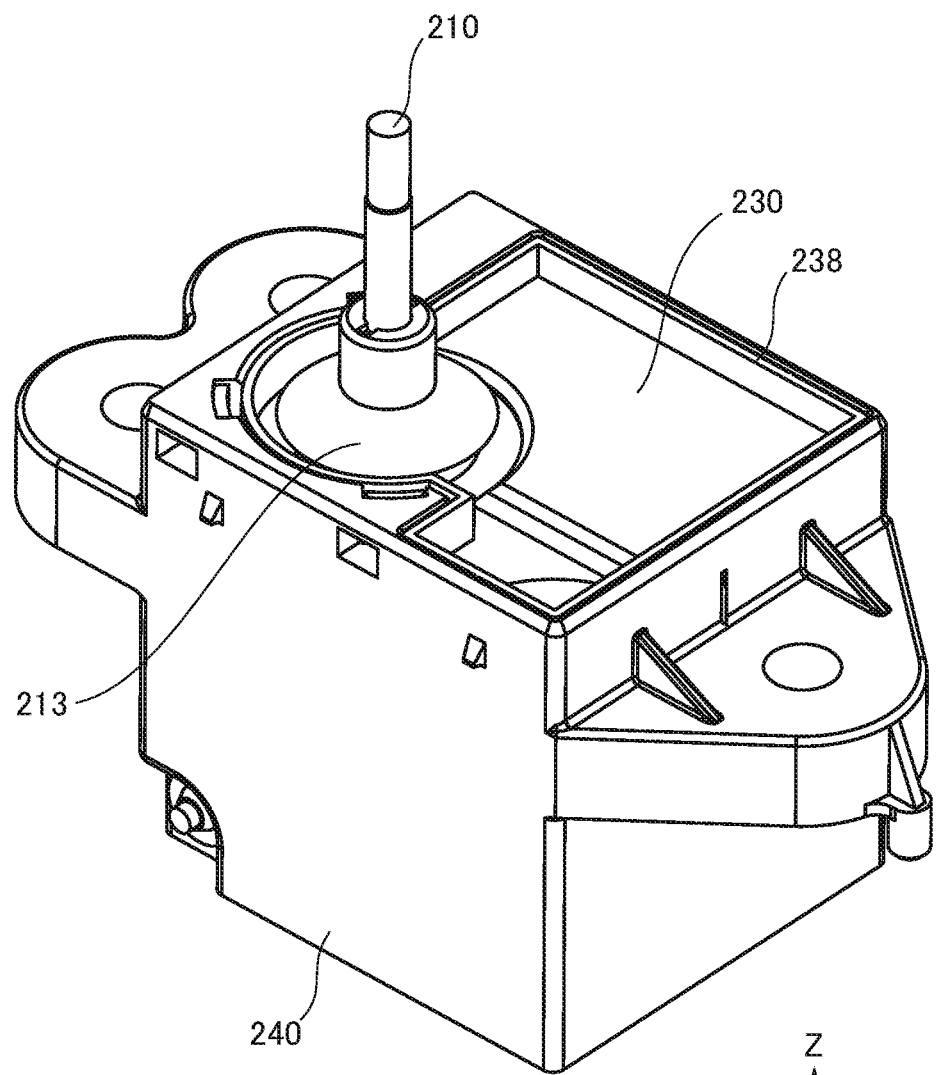
Fig. 18
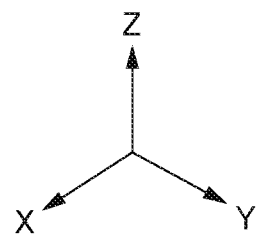

SHIFTING DEVICE

BACKGROUND OF THE INVENTION

The present invention relates to a shifting device mounted on a vehicle in order to shift a shift position.

Conventionally, a shifting device that detects a shift position using a sensor (see PTL 1) is configured such that hall ICs are provided on a single circuit board, a shifting direction is detected by a rotational position of a magnet, and a selecting direction is detected by a change in a magnetic flux when a yoke moves in an axial direction with respect to the magnet. In this manner, as a mechanism in which directions for detection are different between the shifting direction and the selecting direction has conventionally been employed, a stroke of operation largely varies depending on the direction and thus a structure of the device increases in size. Further, as a magnetoresistive element is used, detection of the shifting direction in a rotational direction is susceptible to temperature change.

Moreover, in a case of the shifting device employing a conventional sensor, water or the like running down the shift lever may possibly enter into the shifting device. As water or the like reaching the sensor becomes a cause of failure or the like, it is desired to take measures against water exposure for the shifting device employing a sensor. However, according to the technique of PTL 1 described above, as guide grooves such as a shift gate and a select gate are opening upward, taking measures against water exposure has been difficult.

Furthermore, conventionally, while a mechanism of shift-locking when an engine is turned off (e.g., PTL 2) has been provided, the shift-lock is performed using solenoid, and whether or not a state is in a shift-lock state has not been detected. In addition, while there is known a device provided with a function for, if it is detected that the shift lever is not at a home position but in a manual position when an engine is turned off, retuning the shift lever to the home position, such a function is provided separately from the shift-lock mechanism.

The following two patent literature documents are referred to herein:
PTL 1: Japanese Unexamined Patent Application Publication No. 2007-62664
PTL 2: Japanese Patent No. 3996380

SUMMARY OF THE INVENTION

An object of the present invention is to provide a shifting device with a simplified structure, which is easily reduced in size and insusceptible to temperature change.

Further, another object of the present invention is to provide a shifting device with a simplified structure, which is easily reduced in size, insusceptible to temperature change, and capable of preventing a foreign matter from entering.

Moreover, yet another object of the present invention is to provide a shifting device that is further reduced in size by integrating shift-lock of a shift mechanism and a mechanism for returning to a manual mode such that detection means for detecting whether or not a state is in a shift-lock state and detection means for detecting a shift position are provided on the same circuit board.

(1) One or more embodiments of the present invention provide a shifting device including: an operable shift lever; a guide member having a guide groove for guiding the shift lever to a plurality of operational positions; a circuit board having a detector member arranged thereon, the detector member being for detecting a swing direction of the shift lever; a base member having a container section for holding the circuit board; and a casing for accommodating the circuit board and the base member, and further provided with: a first detection target member pivotally-supported by the base member in a turnable manner, and configured to turn following swinging of the shift lever in a first swing direction; and a second detection target member pivotally-supported by the base member in a turnable manner, and configured to turn following swinging of the shift lever in a second swing direction, wherein the detector member includes: a first detector member mounted on the circuit board, and facing against a detection target section of the first detection target member; and a second detector member mounted on a surface of the circuit board, and facing against a detection target section of the second detection target member, the surface being identical to a surface on which the first detector member is mounted.

(2) One or more embodiments according to the present invention provide the shifting device of (1) including: a ball section integrally provided for one end section of the shift lever; and a concave section provided for the base member, and holding the ball section in a swingable manner, wherein the first detection target member is configured by a rotor member pivotally-supported by the base member in a turnable manner, and holding the detection target section at one end section in a manner rotatable in a plane vertical to a rotational axis of the first swing direction, the second detection target member is configured by a lever member pivotally-supported by the base member in a turnable manner, and holding the detection target section at one end section of an arm section extending in a direction vertical to a rotational axis of the second swing direction, and engagement pieces are provided respectively at the other ends of the rotor member and the lever member, the engagement pieces being respectively engaged with engagement grooves provided for the ball section and in a direction of an operational axis of the shift lever, the engagement pieces following movement of the shift lever in one of the first swing direction and the second swing direction.

(3) One or more embodiments according to the present invention provide the shifting device of (2), wherein the detection target section of the first detection target member is a magnet provided for the rotor member such that both an N pole and an S pole of the magnet face against the first detector member, and the first detector member is a hall sensor for detecting a rotational angle of the magnet when the rotor member rotates according to the first swing direction of the shift lever in a state in which the magnet as the detection target section of the first detection target member faces against the first detector member.

(4) One or more embodiments according to the present invention provide the shifting device of (2), wherein the detection target section of the second detection target member is a magnet provided for the lever member so as to be able to face against the second detector member, and the second detector member is a hall sensor for detecting whether or not the magnet is at a facing position when the lever member moves the magnet as the detection target section of the second detection target member either away from or closer to the second detector member according to the second swing direction of the shift lever.

(5) One or more embodiments according to the present invention provide according to the shifting device of (3), wherein a convex section corresponding to the concave section is provided on a side opposite of the concave section of the base member, the shift lever is disposed through a through hole opening in the convex section, the shifting device is further provided with a guide cover fitting with the shift lever and provided so as to cover the convex section, the guide cover being provided for preventing a foreign matter from entering the through hole in the convex section from outside and for guiding the foreign matter to a peripheral section of the convex section, and the base member further includes: a wall section for preventing the foreign matter guided by the guide cover from moving outside the base member; and a discharge section for discharging the foreign matter guided by the guide cover outside the base member.

(6) One or more embodiments according to the present invention provide a shifting device including: a shift lever configured to be operated from a neutral position to a plurality of operational positions; a guide member having a guide groove for guiding the shift lever to the plurality of operational positions; a circuit board having a detector member arranged thereon, the detector member being for detecting a swing direction of the shift lever; and a shift lever restricting mechanism configured to restrict the shift lever, under a predetermined condition, from moving to a predetermined operational position, and further provided with: a first detection target member configured to change a position following swinging of the shift lever in a first swing direction; a second detection target member configured to change a position following swinging of the shift lever in a second swing direction; a restricting member provided for the shift lever restricting mechanism, and configured to change a position between a shift-restricting position and a released position; and a third detection target member configured to change a position following an operation of the restricting member, wherein the detector member includes: a first detector member mounted on the circuit board, and facing against a detection target section of the first detection target member; and a second detector member mounted on a surface of the circuit board, and facing against a detection target section of the second detection target member, the surface being identical to a surface on which the first detector member is mounted, and further includes: a third detector member mounted on a surface of the circuit board, and facing against a detection target section of the third detection target member, the surface being identical to the surface on which the first detector member is mounted.

(7) One or more embodiments according to the present invention provide the shifting device of (6) including: an actuator configured to drive the shift lever restricting mechanism; a control section configured to control the actuator; and, a shift lever holding mechanism configured to hold the shift lever in a manual operation position when the shift lever is operated from the neutral position to the manual operation, wherein the restricting member includes a contact section configured to be brought into contact with the shift lever and to release the shift lever from a holding state by the shift lever holding mechanism, the contact section being brought into contact with the shift lever by actuation of the actuator by the control section under a condition that a predetermined condition is satisfied when the shift lever is in the manual operation position, to change the position of the restricting member.

(8) One or more embodiments according to the present invention provide the shifting device of (7), wherein the restricting member includes an arc-like cam section provided rotatably about and integrally with a rotational shaft parallel to the shift lever when the shift lever is in the neutral position, the cam section being eccentric with respect to the rotational shaft and having the contact section.

(9) One or more embodiments according to the present invention provide the shifting device of (8), wherein if the control section determines that a vehicle satisfies a predetermined shift-restriction condition when the shift lever is in the manual operation position, the control section controls the actuator such that, by actuating the actuator to drive the restricting member to bring the cam section into contact with the shift lever, the shift lever is released from the holding state by the shift lever holding mechanism and the restricting member is held in the shift-restricting position at which the shift lever is prevented from moving from the neutral position to the manual operation position.

According to the present invention, the shifting device may be configured to have a simplified structure, and be easily reduced in size and insusceptible to temperature change.

Further, the shifting device according to the present invention may be configured to have a simplified structure, and be easily reduced in size, insusceptible to temperature change, and capable of preventing a foreign matter from entering.

Moreover, the shifting device according to the present invention may be further reduced in size by integrating shift-lock of a shift mechanism and a mechanism for returning to a manual mode such that detection means for detecting whether or not a state is in a shift-lock state and detection means for detecting a shift position are provided on the same circuit board.

BRIEF DESCRIPTION OF THE DRAWINGS

FIG. 18 is a perspective view of the shifting device 2 with a knob 214 and a bezel 220 in FIG. 17 are removed.

DETAILED DESCRIPTION OF PREFERRED EMBODIMENTS

Hereinafter, best modes for carrying out the present invention will be described with reference to the drawings.

First Embodiment

Figure 1:
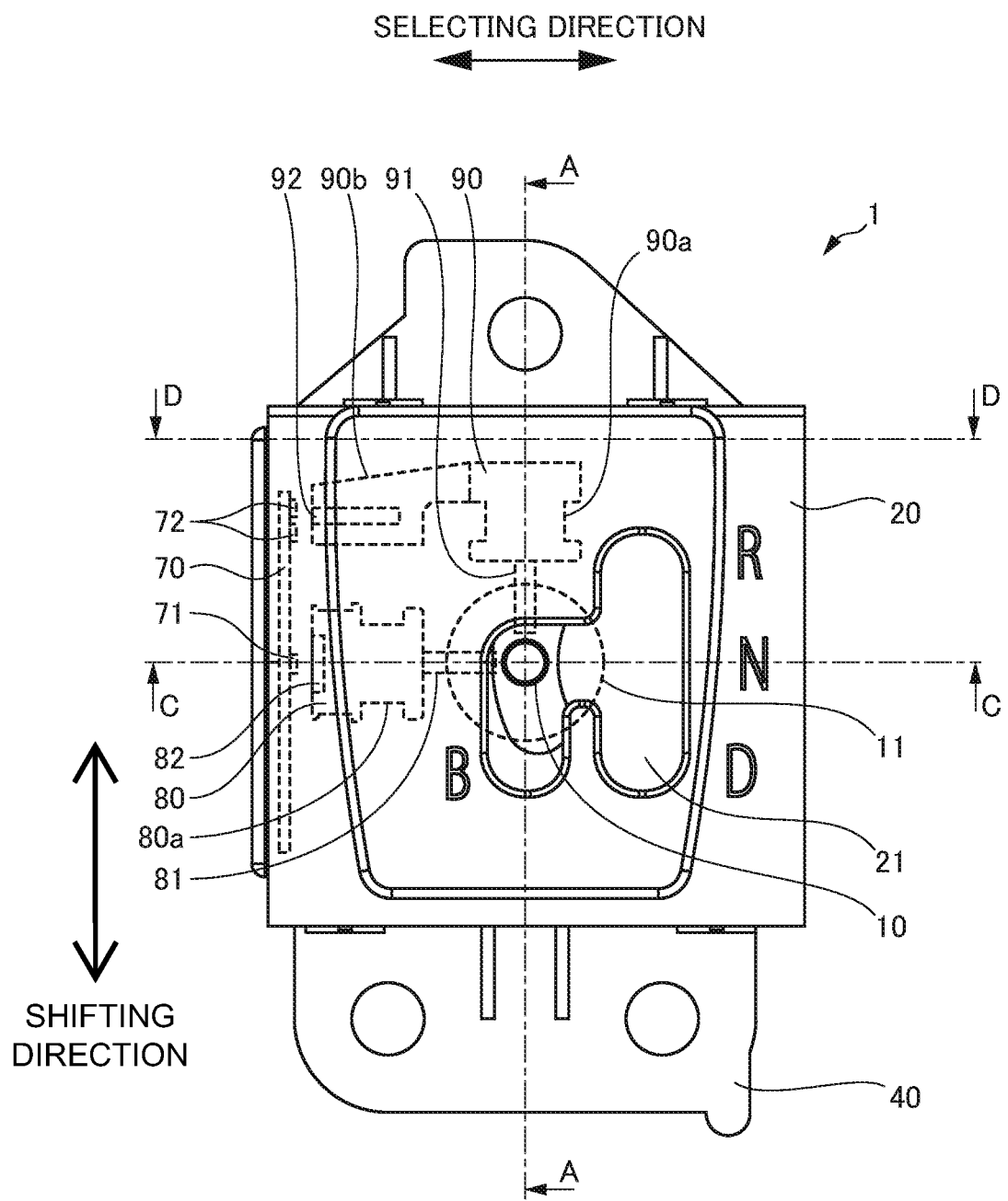
FIG. 1 is an upper view illustrating an embodiment of a shifting device 1 according to the present invention.

FIG. 1 is an upper view illustrating an embodiment of a shifting device 1 according to the present invention. In FIG. 1, a part of components are shown transparent.

Figure 2:
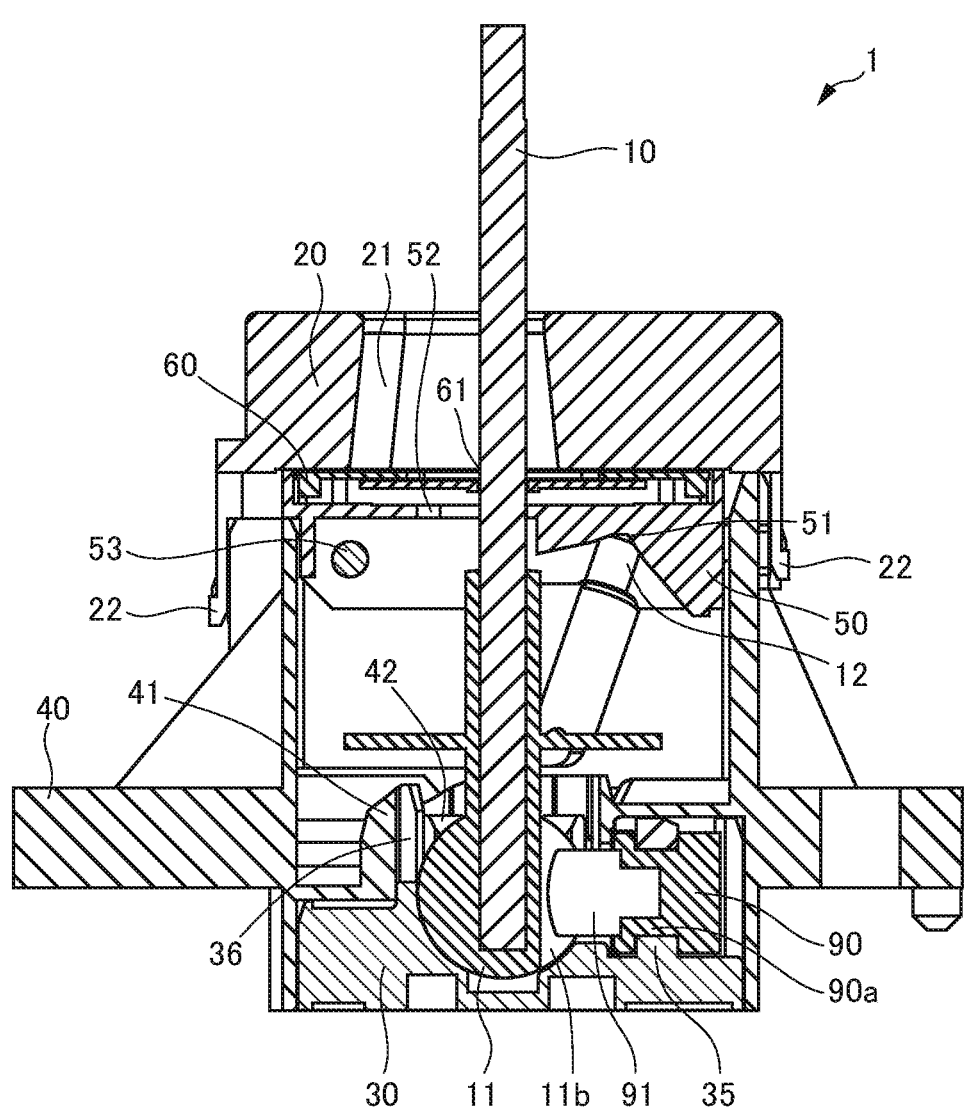
FIG. 2 is a sectional view of the shifting device 1 taken along line indicated by an arrow A-A in FIG. 1.

FIG. 2 is a sectional view of the shifting device 1 taken along line indicated by an arrow A-A in FIG. 1.

Figure 3:
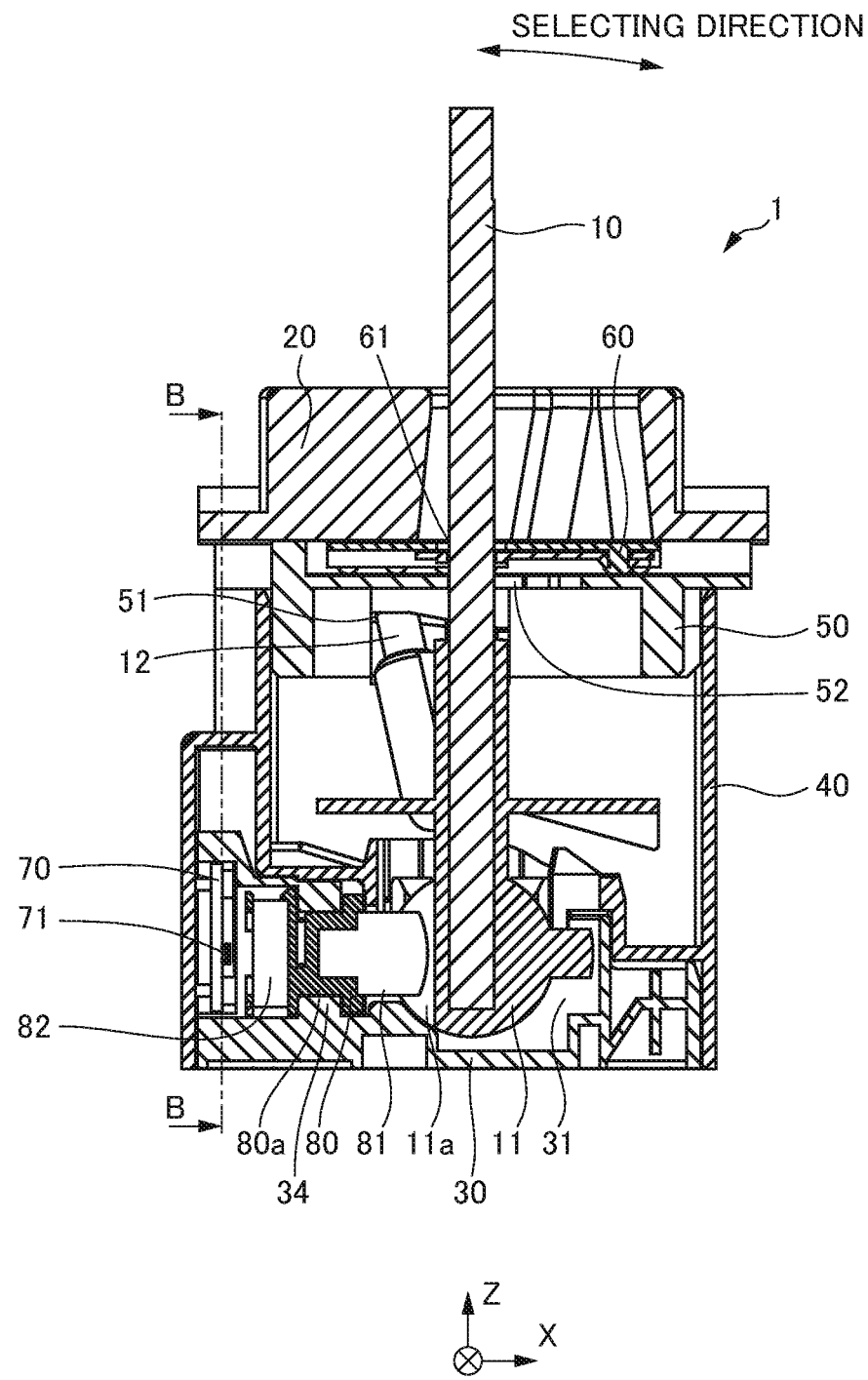
FIG. 3 is a sectional view of the shifting device 1 taken along line indicated by an arrow C-C in FIG. 1.

FIG. 3 is a sectional view of the shifting device 1 taken along line indicated by an arrow C-C in FIG. 1.

Figure 4:
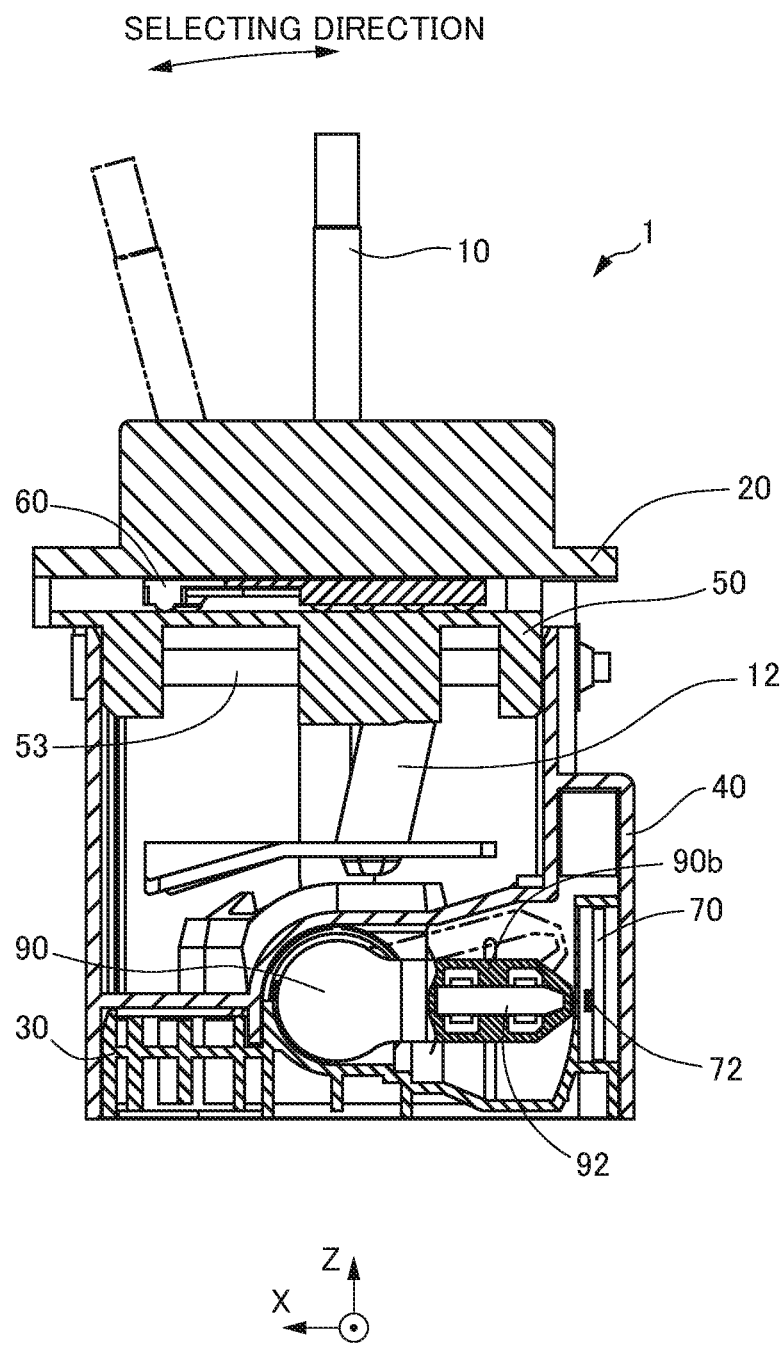
FIG. 4 is a sectional view of the shifting device 1 taken along line indicated by arrow D-D an in FIG. 1.

FIG. 4 is a sectional view of the shifting device 1 taken along line indicated by an arrow D-D an in FIG. 1.

Figure 5:
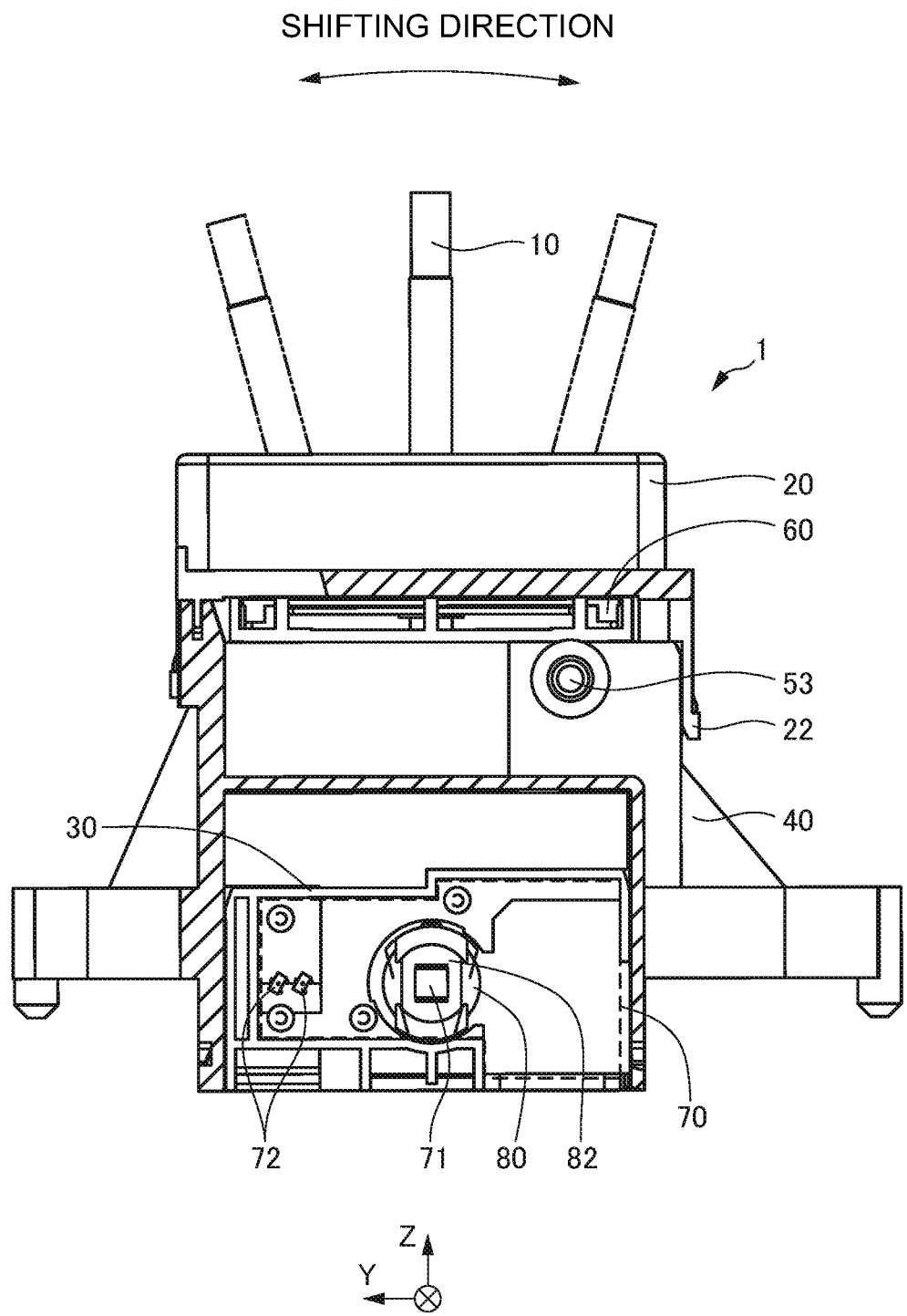
FIG. 5 is a sectional view of the shifting device 1 taken along line indicated by an arrow B-B in FIG. 3.

FIG. 5 is a sectional view of the shifting device 1 taken along line indicated by an arrow B-B in FIG. 3.

Figure 6:
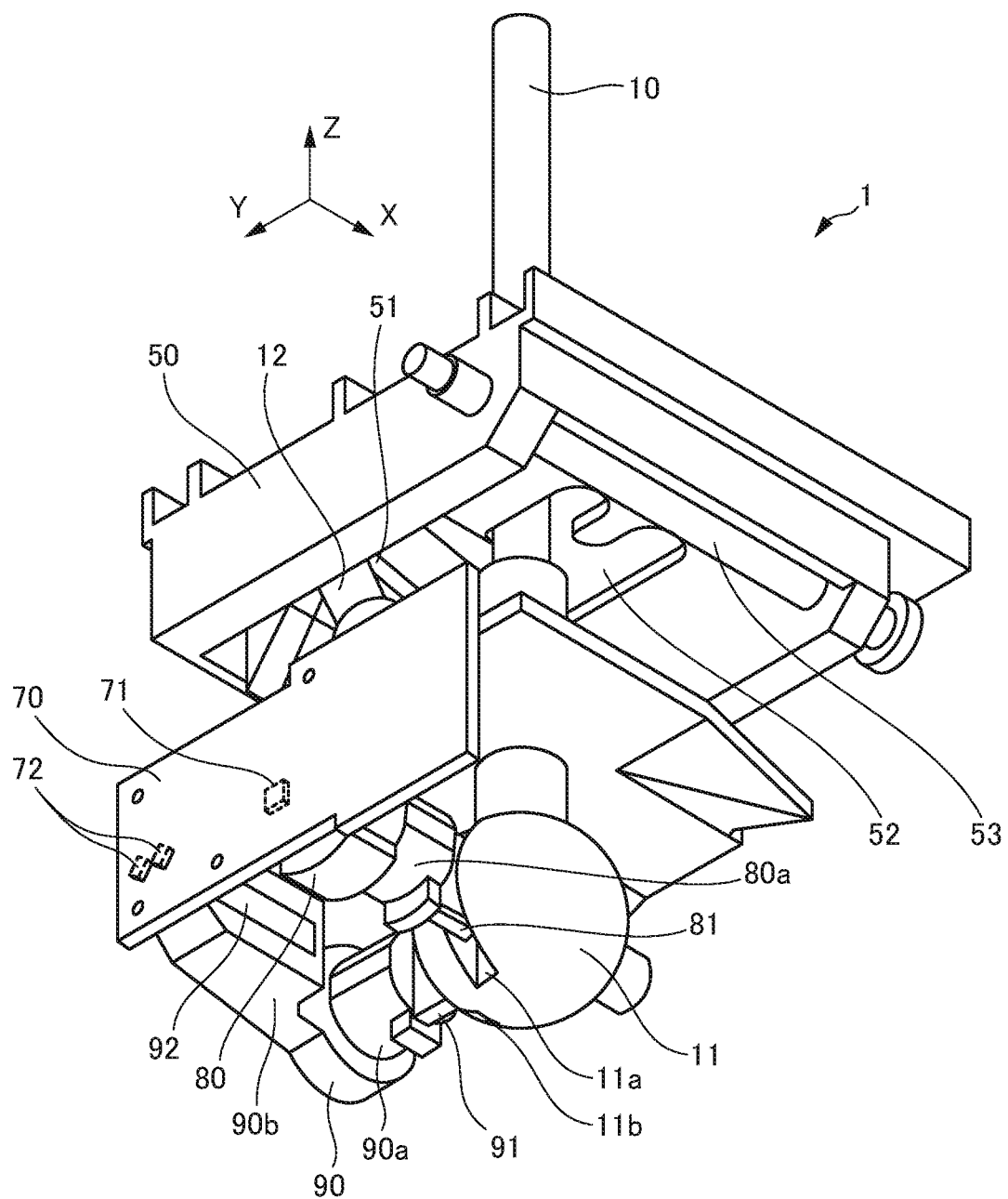
FIG. 6 is a perspective view illustrating apart of members constituting the shifting device 1.

FIG. 6 is a perspective view illustrating a part of the components constituting the shifting device 1.

It should be noted that the drawings listed below including FIG. 1 to FIG. 6 are schematic illustration, and sizes and shapes of the components are shown emphasized and not to scale as needed in order to facilitate understanding.

Further, while reference is made to specific values, shapes, materials, and the like in the following description, these specifics may be altered as needed.

Moreover, while an XYZ orthogonal coordinate system is provided in the drawings listed below in order to facilitate illustration and understanding, this is not for indicating absolute coordinates, but merely for showing common orientation in the drawings.

The shifting device 1 includes a shift lever 10, a guide member 20, a base member 30, a casing 40, a guide case 50, a guide cover 60, a circuit board 70, a rotor member 80, and a lever member 90, and is mounted on a vehicle to shift a shift position of the vehicle.

The shift lever 10 is a lever that can be operated by a driver, and held by the base member 30 and the casing 40 in a manner swingable taking a ball section 11 provided below (in a negative Z side) as a fulcrum. A direction in which the shift lever 10 is allowed to swing is restricted to a direction guided by a guide groove 21 provided for the guide member 20 that will be described later. Specifically, the direction in which the shift lever 10 is allowed to swing is restricted to a selecting direction in which an upper end (positive Z side end) of the shift lever 10 moves in an X direction, and a shifting direction in which the upper end (positive Z side end) of the shift lever 10 moves in an Y direction.

The ball section 11 is integrated with the shift lever 10 by the shift lever 10 being inserted therethrough, and has a substantial spherical outer shape. The ball section 11 is provided with engagement grooves 11a and 11b opening in a slit shape respectively on a negative X side and a positive Y side.

With the engagement groove 11a, an engagement piece 81 that will be later described is slidably engaged. Further, with the engagement groove 11b, an engagement piece 91 that will be later described is slidably engaged.

Moreover, to the ball section 11, a click member 12 is attached. The click member 12 is provided with a bias member and a small spherical object that are not shown, and the small spherical object disposed at a tip end of the click member 12 is in contact with a click groove 51 of the guide case 50 in a biased manner. When the shift lever 10 is operated, as the click member 12 moves to an adjacent click groove 51, it is possible to provide an appropriate sense of resistance (clicking feeling) in operation, and thus to improve operational feeling. Further, an operational position of the shift lever 10 may be held by the engagement between the click member 12 and the click groove 51.

Other than an operating portion of the shift lever 10, the guide member 20 is disposed on a surface closest to the driver, and the guide groove 21 is opening therein. The guide member 20 is attached to the casing 40 using a hook section 22 so as to sandwich the ball section 11, the guide case 50, the guide cover 60, in a state in which the shift lever 10 is inserted through the guide groove 21.

The guide groove 21 guides the shift lever 10 to a plurality of operational positions. Specifically, the guide groove 21 guides so as to restrict a swing range of the shift lever 10 to shift positions including R position (reverse), D position (drive), N position (neutral), center position (a position illustrated in FIG. 1), and B position (inertia brake). B position may be L position (Low), M position (manual), or the like. As used herein, a swing direction in which the tip end of the shift lever 10 moves in the Y direction is referred to as a shifting direction (first swing direction), and a swing direction in which the tip end of the shift lever 10 moves in the X direction is referred to as a selecting direction (second swing direction).

The base member 30 is provided on a side of a lower end (negative Z side) of the shifting device 1.

Figure 7:
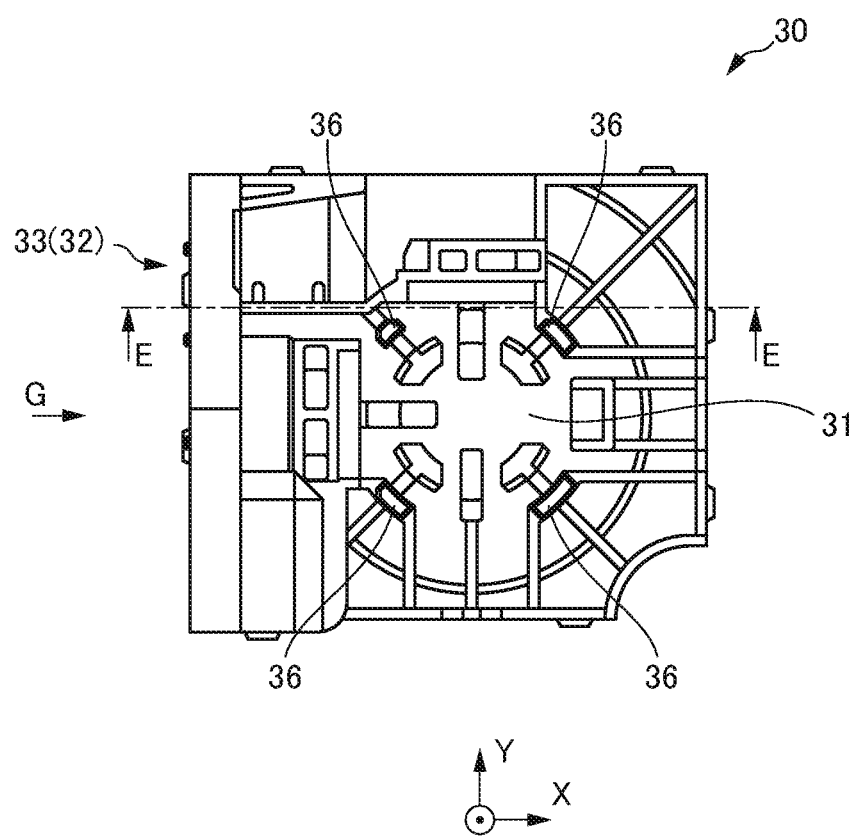
FIG. 7 is an upper view illustrating a base member 30.

FIG. 7 is an upper view illustrating the base member 30.

Figure 8:
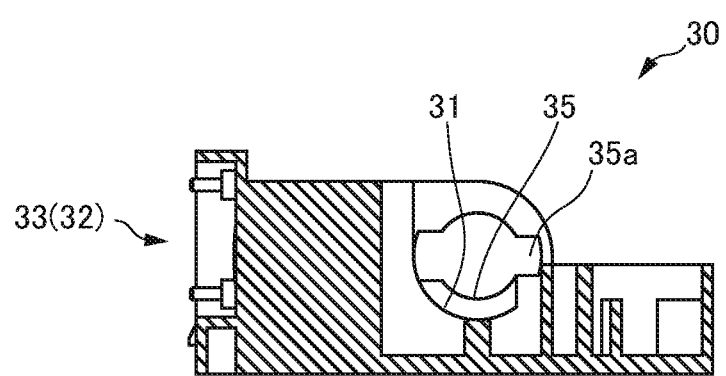
FIG. 8 is a sectional view of the base member 30 taken along line indicated by an arrow E-E in FIG. 7.
Figure 8:
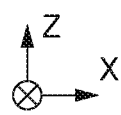

FIG. 8 is a sectional view of the base member 30 taken along line indicated by an arrow E-E in FIG. 7.

Figure 9:
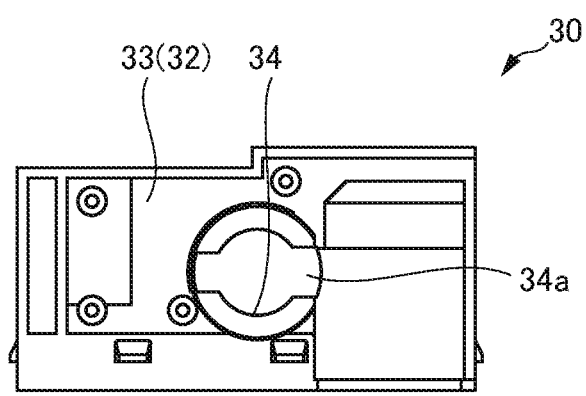
FIG. 9 is a view of the base member 30 seen along an arrow G in FIG. 7.
Figure 9:
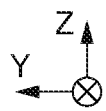

FIG. 9 is a view of the base member 30 seen along an arrow G in FIG. 7.

The base member 30 includes, in its substantial center, a concave section 31 in which the ball section 11 is held, and thus holds the shift lever 10 in a swingable manner. As illustrated in FIG. 8, the concave section 31 opens upward (positive Z side) and rightward in FIG. 8 (positive X side).

For a plane on a left side (negative X side) in FIG. 8 of the base member 30, there is provided a container section 33 having a container opening 32 opening sideward (negative X side). The container section 33 holds and accommodates the circuit board 70. As the container opening 32 opens to a direction opposite of the opening of the concave section 31, the concave section 31 and the container opening 32 may be provided by a single base member 30. Further, with the casing 40 that will be later described, it is possible to easily provide a configuration in which the concave section 31 and the container opening 32 are fully covered.

The base member 30 further includes a first pivotally-supporting section 34 and a second pivotally-supporting section 35 pivotally-supporting, respectively, the rotor member 80 and the lever member 90 in a turnable manner.

The first pivotally-supporting section 34 pivotally-supports a shaft section 80a of the rotor member 80 in a manner turnable following swinging of the shift lever 10 in the shifting direction.

The second pivotally-supporting section 35 pivotally-supports a shaft section 90a of the lever member 90 in a manner turnable following swinging of the shift lever 10 in the selecting direction.

As illustrated in FIG. 9 and FIG. 8, the first pivotally-supporting section 34 and the second pivotally-supporting section 35 are provided in a shape in which cut-out openings 34a and 35a are connected, each of the cut-out openings 34a and 35a is an opening defining a shape of circle with a portion convex peripherally outward. The rotor member 80 and the lever member 90 are attached by positioning and inserting corresponding retaining sections of the rotor member 80 and the lever member 90 respectively in the cut-out openings 34a and 35a.

The base member 30 further includes holding plates 36 inserted into through holes 43 that will be later described in the casing 40 around the concave section 31.

The casing 40 is in a box shape opening downward (negative Z side) so as to accommodate, along with the circuit board 70, the base member 30 to which the circuit board 70 is attached. The casing 40 also includes a box section opening upward (positive Z side), where the click member 12 attached to the ball section 11 and a part of the guide case 50 are accommodated.

Figure 10:
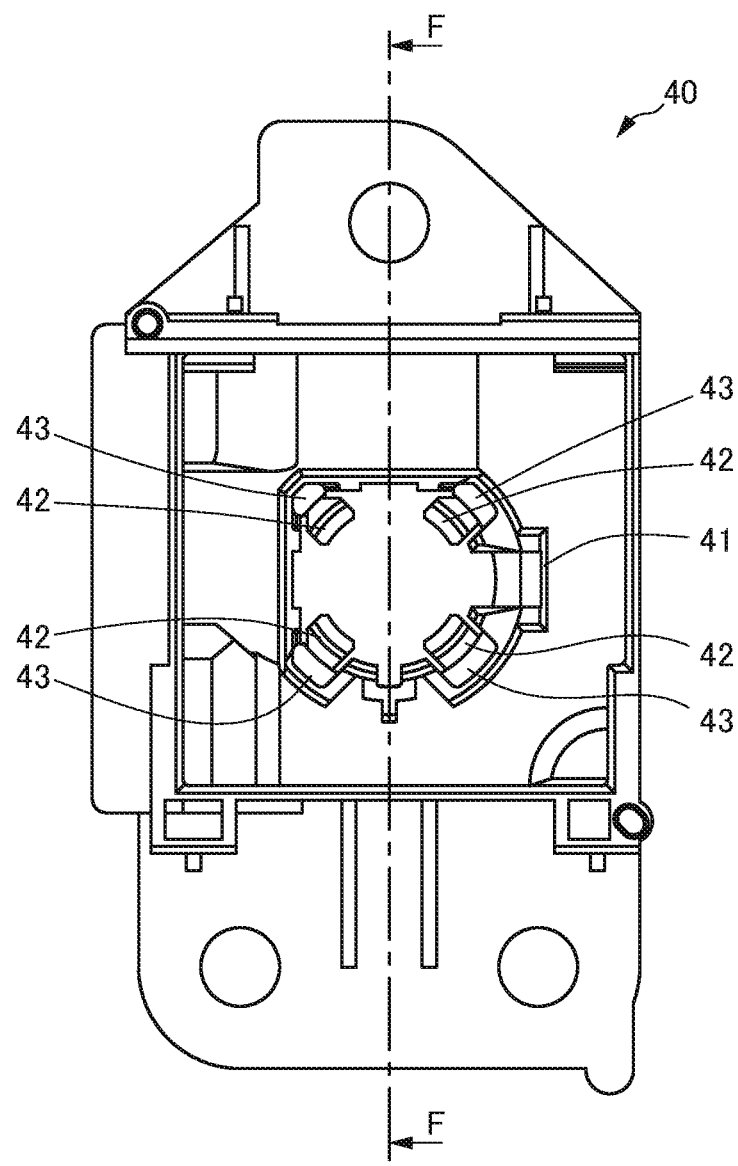
FIG. 10 is an upper view illustrating a casing 40.

FIG. 10 is an upper view illustrating the casing 40.

Figure 11:
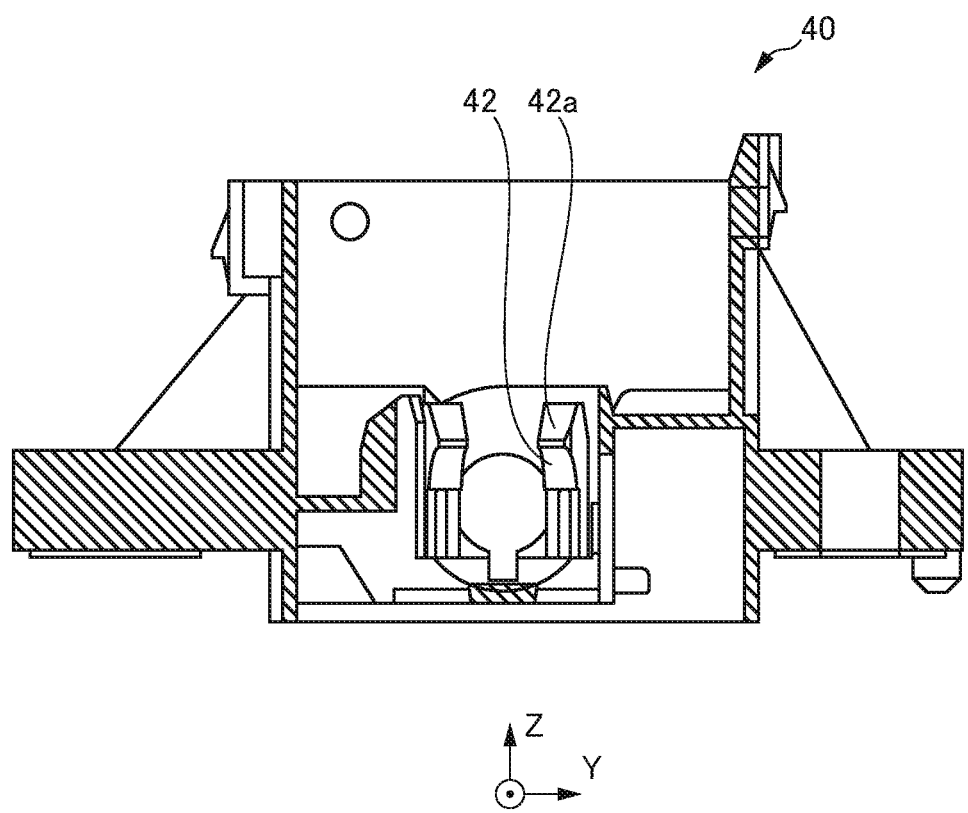
FIG. 11 is a sectional view of the casing 40 taken along line indicated by an arrow F-F in FIG. 10.

FIG. 11 is a sectional view of the casing 40 taken along line indicated by an arrow F-F in FIG. 10.

The casing 40 includes a ball containing section 41 substantially in a cylindrical shape larger than the ball section 11 at a position where the ball section 11 is accommodated. Along an inner circumference of the ball containing section 41, elastic claw sections 42 and the through holes 43 are provided.

Each of the elastic claw sections 42 includes a catching section 42a engaged with the ball section 11 in an axial direction of the shift lever 10 (Z direction). In this embodiment, the catching sections 42a are provided at four positions.

Each of the through hole 43 is provided penetrating through in an up-down direction (Z direction) on a rear side of the corresponding elastic claw section 42, that is, on a side opposite of the side on which the catching section 42a projects to accommodate the ball section 11e.

Figure 12:
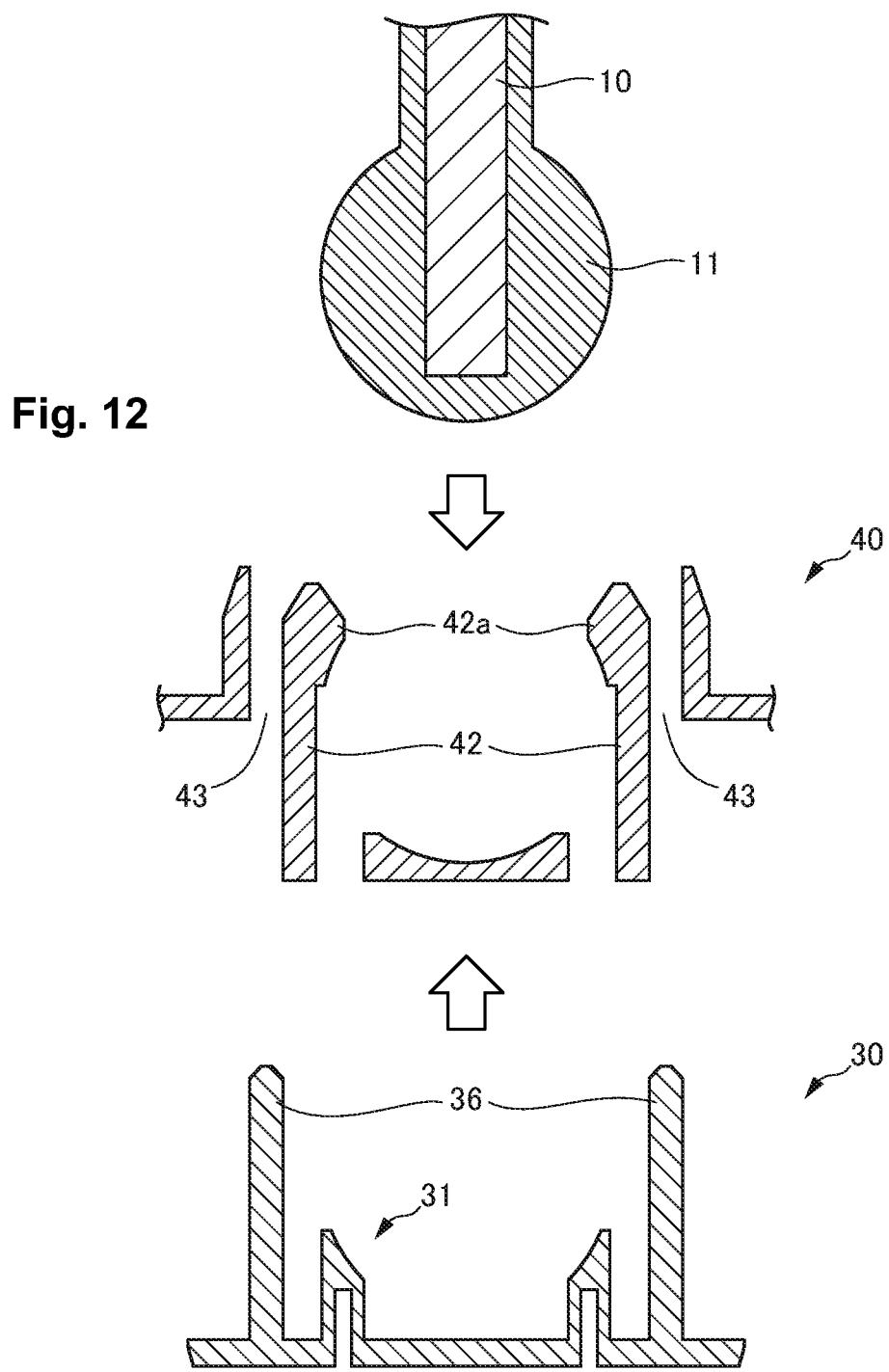
FIG. 12 is an enlarged sectional view illustrating of a portion of the casing 40 near an elastic claw section 42 along with a ball section 11 and the base member 30, before the ball section 11 and the base member 30 are assembled.

FIG. 12 is an enlarged sectional view illustrating of a portion of the casing 40 near the elastic claw section 42 along with the ball section 11 and the base member 30, before the ball section 11 and the base member 30 are assembled.

In the state in which the base member 30 is not attached to the casing 40, the elastic claw sections 42 provided for the casing 40 are allowed to elastically deform respectively toward the through holes 43 so that the ball section 11 may be inserted through the catching sections 42a in the axial direction of the shift lever 10 (Z direction).

Figure 13:
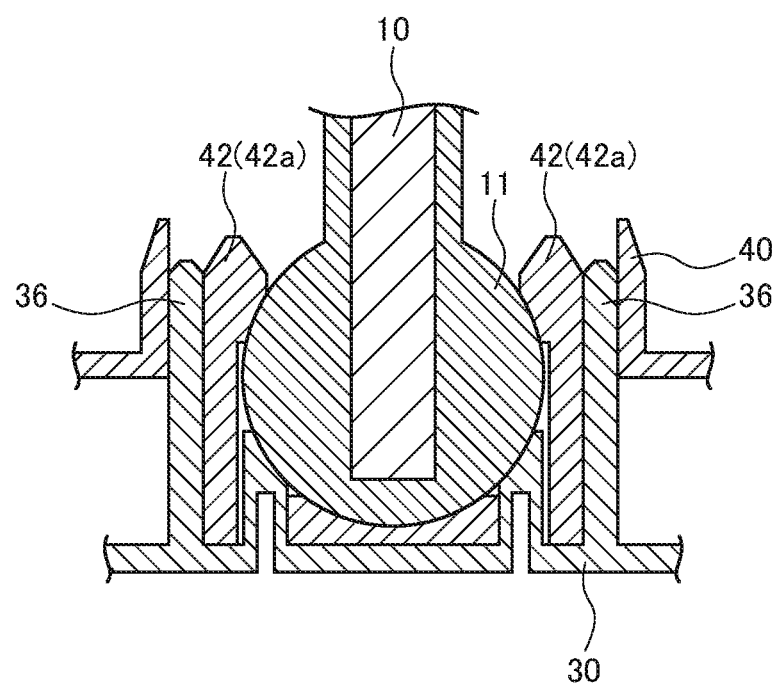
FIG. 13 is an enlarged sectional view illustrating a portion of the casing 40 near the elastic claw section 42 with the ball section 11 and the base member 30 being assembled.

FIG. 13 is an enlarged sectional view illustrating a portion of the casing 40 near the elastic claw section 42 with the ball section 11 and the base member 30 being assembled.

In the casing 40, the ball section 11 is first inserted through the catching sections 42a in the axial direction of the shift lever 10 (Z direction), and then the base member 30 is attached to the casing 40. In the state in which the base member 30 is attached to the casing 40, each of the holding plates 36 is inserted into the corresponding through hole 43 and positioned between the rear side of the corresponding elastic claw section 42 and the ball containing section. In this state, the holding plates 36 inserted through the through holes 43 prevents elastic deformation of the elastic claw sections 42 provided for the casing 40. Thus, the elastic claw sections 42 are not allowed to elastically deform in the state in which the catching sections 42a are engaged with the ball section 11. In this manner, the ball section 11 is reliably held by the base member 30 and the casing 40 in the state in which the shift lever 10 is allowed to swing.

The guide case 50 is provided between the ball section 11 and the guide member 20. In a plane on a downward side (negative Z side) of the guide case 50, click grooves 51 are provided at positions corresponding to positions of the click member 12 that moves according to the shift position of the shift lever 10. Further, a guide groove 52 similar to the guide groove 21 of the guide member 20 opens in the guide case 50, and the shift lever 10 penetrates through the guide groove 52.

Similarly to the guide groove 21, the guide groove 52 also guides the shift lever 10 to the plurality of operational positions. It should be noted that the guide groove 52 guides the shift lever 10 by contact, and the guide case 50 receives a load from the shift lever 10. Therefore, the guide case 50 is securely fixed to the casing 40 using a shaft 53.

The guide cover 60 is provided at a position between the guide member 20 and the guide case 50 so as to be movable in an XY plane. In the guide cover 60, a round hole 61 that is substantially as large as the outer shape of the shift lever 10 opens, and the shift lever 10 penetrates through the round hole 61. The guide cover 60 moves to cover the guide groove 52 of the guide case 50 as the shift lever 10 swings, and thus to provide a favorable external appearance as well as to prevent a foreign matter from entering inside.

The circuit board 70 is positioned within the container section 33 of the base member 30 so that its board surface is parallel with an YZ plane. The circuit board 70 is provided with hall sensors 71 and 72 as a detector member for detecting the swing direction of the shift lever 10, and the hall sensors 71 and 72 are disposed at positions at which the sensors are respectively allowed to face against a magnet 82 of the rotor member 80 and a magnet 92 of the lever member 90.

The hall sensor (first detector member) 71 detects a rotational angle of the magnet 82 when the rotor member 80 rotates according to swinging of the shift lever 10 in the shifting direction in a state in which the magnet 82 faces against the hall sensor 71. As the hall sensor 71, a hall IC is used, capable of detecting a change in an angle of a magnetic flux due to rotation of the magnet 82, and outputting, as a detection signal, a voltage corresponding to the detected angle of the magnetic flux.

By the hall sensor 71 detecting the rotational angle of the magnet 82, it is possible to determine whether the shift lever 10 has moved to the positive Y side or to the negative Y side in the shifting direction.

The hall sensors (second detector member) 72 detect whether or not the magnet 92 is at a facing position when the lever member 90 moves the magnet 92 either away from or closer to the hall sensors 72 according to swinging of the shift lever 10 in the selecting direction. As the hall sensors 72 only need to determine the presence of the magnet 92, a hall IC that only outputs ON or OFF.

By the hall sensors 72 detecting the position of the magnet 92, it is possible to determine whether the shift lever 10 has moved to the positive X side (either of R, N, and D) or to the negative X side (neutral position, which is the state shown in FIG. 1, or B position) in the selecting direction.

Further, while the two hall sensors 72 are provided in this embodiment so that it is possible to perform detection even if there is a trouble with one of the sensors, only one hall sensor 72 may be provided.

The rotor member (first detection target member) 80 is pivotally-supported by the base member 30 in a turnable manner, and configured to turn following swinging of the shift lever 10 in the shifting direction. The rotor member 80 holds the magnet (detection target section) 82 at one end section (end section on the negative X side) in a manner rotatable in a plane vertical to the rotational axis of the shift lever 10 in the shifting direction (in an YZ plane). The magnet 82 is provided for the rotor member 80 such that both of its N pole and S pole face against the hall sensor 71.

To the other end section of the rotor member 80 (end section on the positive X side), the engagement piece 81 is fixed. The engagement piece 81 is engaged with the engagement groove 11a provided in a direction of an operational axis of the shift lever 10, and rotates following movement of the shift lever 10 in the shifting direction.

The lever member (second detection target member) 90 is pivotally-supported by the base member 30 in a turnable manner, and configured to turn following swinging of the shift lever 10 in the selecting direction. The lever member 90 holds the magnet (detection target section) 92 at one end section of an arm section 90b (end section on the negative X side) extending in a direction vertical to the rotational axis of the selecting direction. In this embodiment, the magnet 92 is provided for the lever member 90 so as to face against the hall sensors 72 when the shift lever 10 is in the center position. To the other end section of the lever member 90 (end section on the positive X side), the engagement piece 91 is fixed. The engagement piece 91 is engaged with the engagement groove 11b provided in the direction of the operational axis of the shift lever 10, and rotates following movement of the shift lever 10 in the selecting direction.

The magnet 92 of this embodiment is configured such that its N pole is on a tip end side (a side closer to the hall sensors 72), and a side of the N pole (tip end side) is configured thinner than a side of an S pole so as to facilitate determination of a polar direction. It should be noted that if the hall sensors 72 are for S pole, the S pole may be on the tip end side of the magnet 92.

As described above, the rotor member 80 and the lever member 90 are connected to the ball section 11 respectively via the engagement piece 81 and the engagement piece 91, and therefore the rotor member 80 and the lever member 90 are able to rotate independently from each other without hindering the movement of the shift lever 10 in the shifting direction and the selecting direction.

Figure 14:
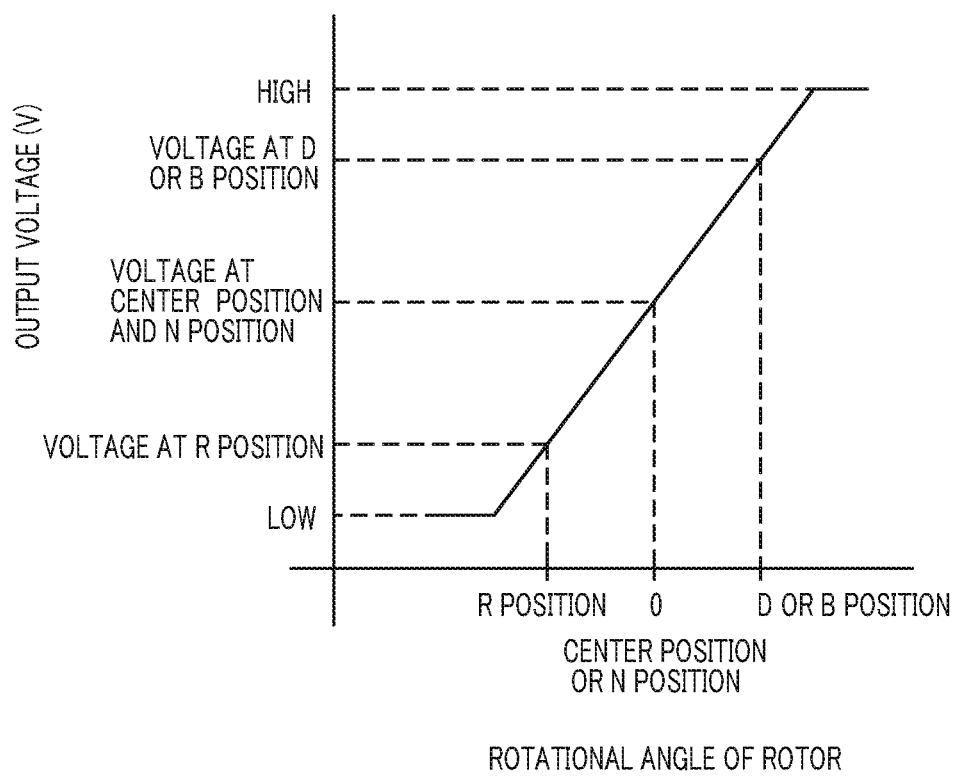
FIG. 14 is a chart showing an output waveform of a hall sensor 71 with a linear output.

FIG. 14 is a chart showing an output waveform of the hall sensor 71 with a linear output.

Figure 15:
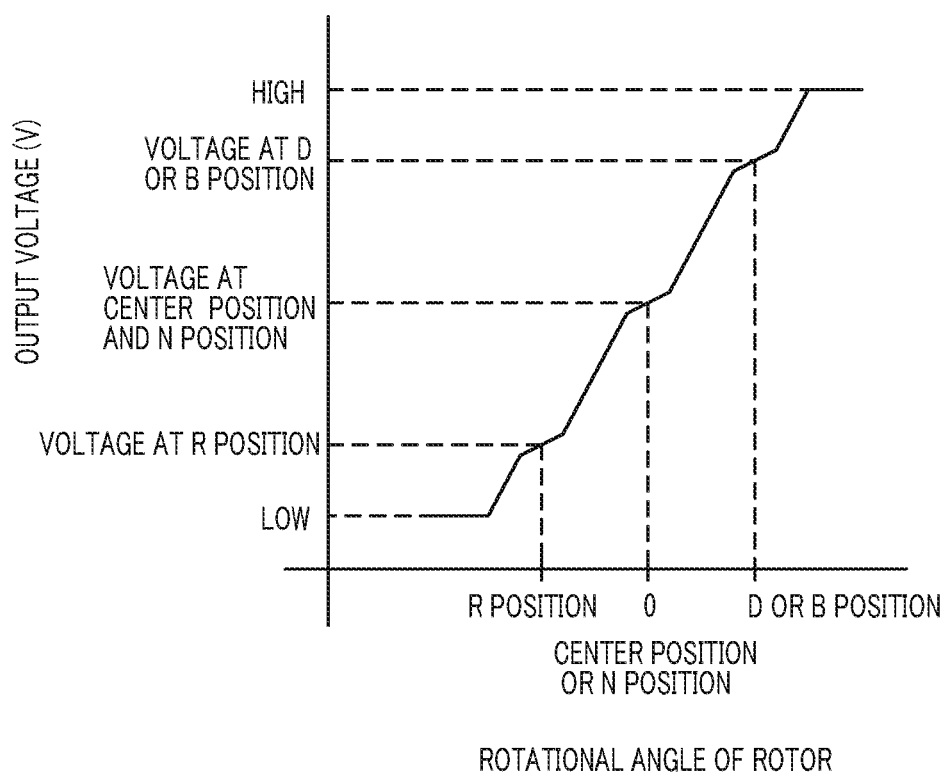
FIG. 15 is a chart showing an output waveform of the hall sensor 71 with a non-linear output.

FIG. 15 is a chart showing an output waveform of the hall sensor 71 with a non-linear output.

As described above, a hall IC capable of detecting a rotational angle is used as the hall sensor 71, and the hall sensor 71 detects the change in the angle of the magnetic flux due to the rotation of the magnet 82, and outputs, as the detection signal, a voltage corresponding to the detected angle of the magnetic flux. For example, it is possible to use a linear hall IC having a linear waveform (linear output) as shown in FIG. 14, or a hall IC having a non-linear waveform (non-linear output) as shown in FIG. 15. With the latter, it is possible to freely set an output of the hall IC without changing specification of an output-side higher ECU that is not shown. In this embodiment, the output waveform of the hall sensor 71 changes such that the output voltage changes linearly in order of the R position, the N position or the center position, and the D position or the B position, depending on the rotational position (rotational angle) of the rotor member 80. Thus, it is possible to determine the swing position of the shift lever 10 in the shifting direction by monitoring the voltage output from the hall sensor 71.

Figure 16:
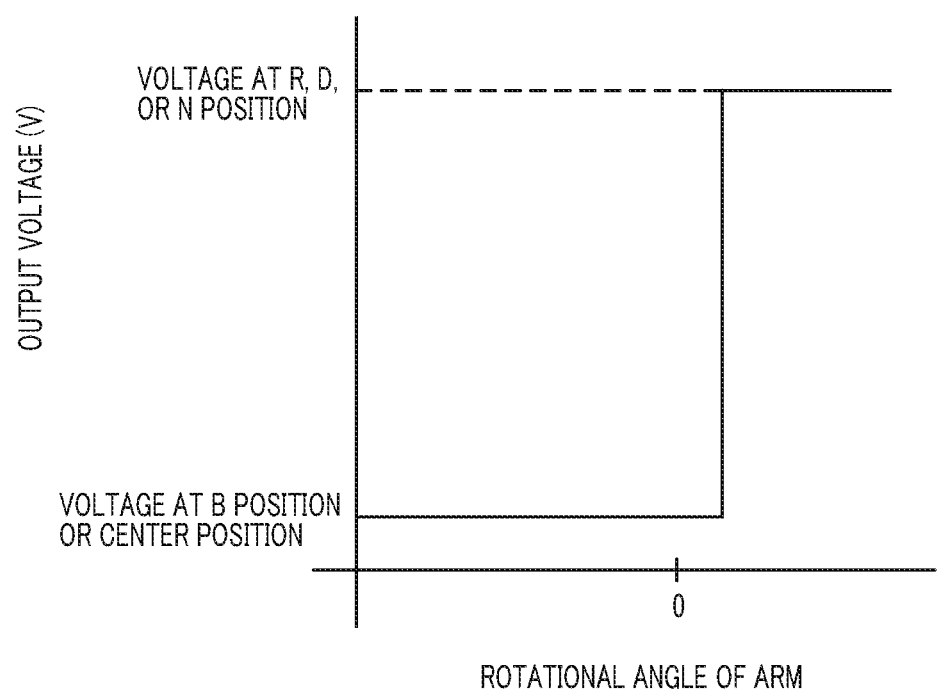
FIG. 16 is a chart showing an output waveform of a hall sensor 72.

FIG. 16 is a chart showing an output waveform of the hall sensors 72.

As described above, as the hall sensors 72 only need to determine the presence of the magnet 92, analog halls IC are used as the hall sensors 72. Further, the output waveform of the hall sensors 72 is shown low at the B position and the center position, and high at the R position, the D position, and the N position, depending on the rotational position (rotational angle) of the lever member 90. Thus, it is possible to determine the swing position of the shift lever 10 in the selecting direction.

Based on the combination of the swing positions of the shift lever 10 in the shifting direction and the selecting direction determined by the output waveforms of the hall sensor 71 and the hall sensors 72 described above, the operational position of the shift lever 10 may be specified.

As described above, according to this embodiment, the shifting device may be configured to have a simplified structure, and be easily reduced in size and insusceptible to temperature change.

Specifically, there are provided the hall sensor 71 and the hall sensors 72 for converting the movement of the shift lever 10 both in the shifting direction and in the selecting direction into rotational movement both of the rotor member 80 and the lever member 90, and for detecting the change in the due to rotation. With this, operation strokes of the rotor member 80 and the lever member 90 may be achieved by a common driving mechanism, and thus the driving mechanism is integrated into a compact size. Further, as the hall sensor 71 and the hall sensors 72 are arranged on the same surface of the circuit board 70, the circuit board 70 may be used in common. Moreover, by providing the base member 30 with a function for holding the shift lever 10 in a swingable manner and a function for holding the circuit board 70, a hold function may be integrated.

Furthermore, the other end sections of the rotor member 80 and the lever member 90 are respectively provided with the engagement pieces 81 and 91 that are respectively engaged with the engagement grooves 11*a* and 11*b* provided for the ball section 11 in the direction of the operational axis of the shift lever 10, and that follow movement of the shift lever 10 in one of the shifting direction and the selecting direction. With this, the driving mechanism with which the rotor member 80 and the lever member 90 turn according to the swinging of the ball section 11 that makes the shift lever 10 swingable may be realized with a simple structure. Further, by providing the base member 30 with a function for pivotally-supporting the rotor member 80 and the lever member 90, in addition to the function for holding the shift lever 10 in a swingable manner and the function for holding the circuit board 70, a structure for holding the components may be integrated into the base member 30. Thus, it is possible to simplify an overall structure and reduce its size.

Moreover, the detection target section of the rotor member 80 is the magnet 82 provided for the rotor member 80 such that both the N pole and the S pole face against the hall sensor 71. The hall sensor 71 detects the rotational angle of the magnet 82 when the rotor member 80 rotates according to swinging of the shift lever 10 in the shifting direction in a state in which the magnet 82 as the detection target section of the rotor member 80 faces against the hall sensor 71. The shifting direction requires detection of important positions such as R (reverse), D (drive), N (neutral), and B (inertia brake), and therefore it is possible to provide a configuration with highly accurate detection by using, as the hall sensor 71, a linear hall IC for detecting the change in the angle of the magnetic flux due to the rotation of the magnet 82.

Further, the detection target section of the lever member 90 is the magnet 92 provided for the lever member 90 so as to face against the hall sensors 72. The hall sensors 72 detects whether or not the magnet 92 is at the facing position when the lever member 90 moves the magnet 92 as the detection target section of the lever member 90 either away from or closer to the hall sensors 72 according to swinging of the shift lever 10 in the selecting direction. The detection in the selecting direction is only between the neutral position and the select position, and the need for detection accuracy in this direction is less required compared to the shifting direction. Therefore, a simple structure capable of detecting the two positions may be employed.

Moreover, as a hall IC is used for either of the hall sensors 71 and 72, it is possible to provide a configuration that is insusceptible to temperature change, thus achieving a stable operation.

Second Embodiment

Figure 17:
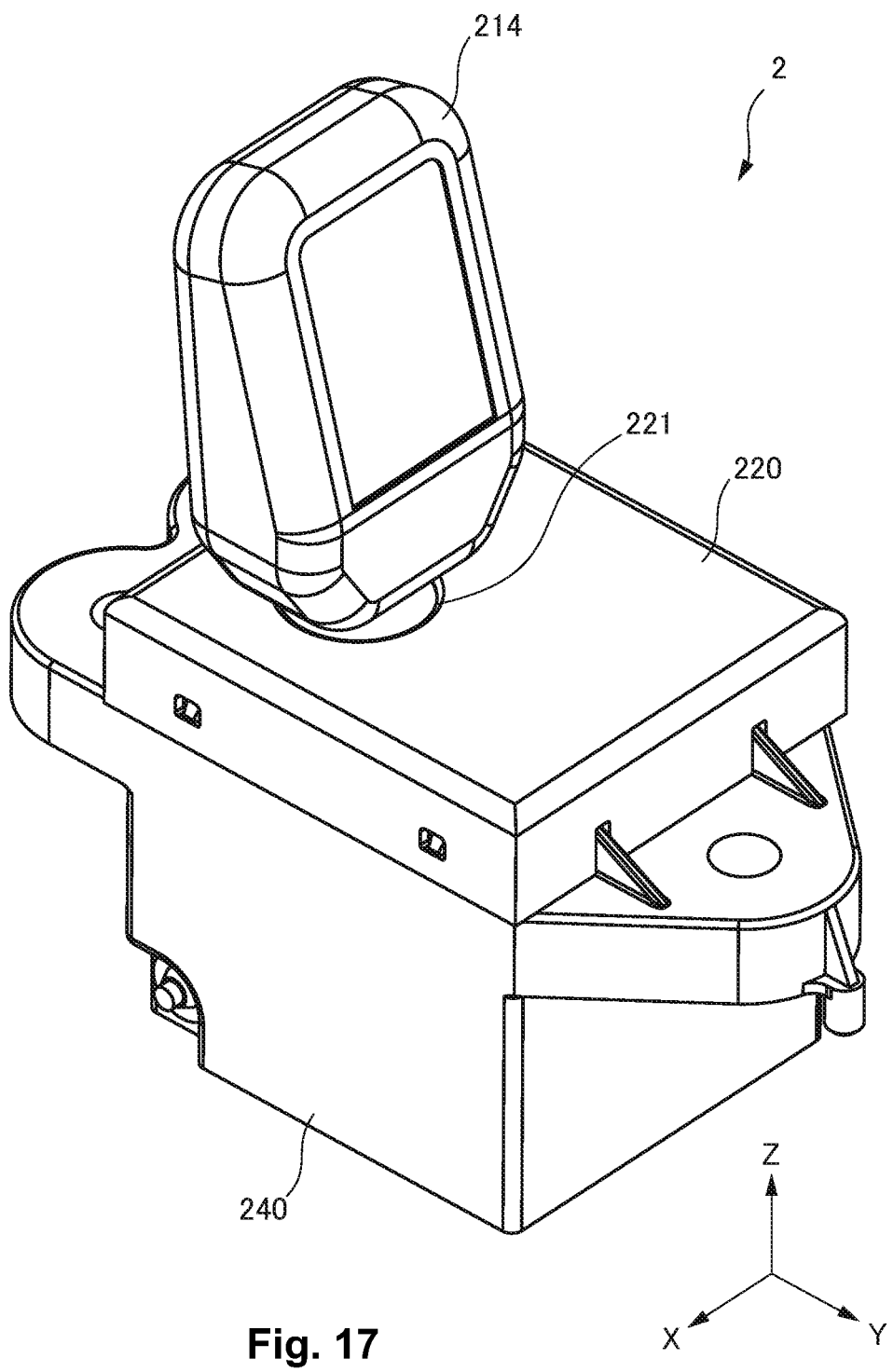
FIG. 17 is a perspective view illustrating an embodiment of a shifting device 2 according to the present invention.

FIG. 17 is a perspective view illustrating an embodiment of a shifting device 2 according to the present invention.

FIG. 18 is a perspective view of the shifting device 2 with a knob 214 and a bezel 220 in FIG. 17 are removed.

Figure 19:
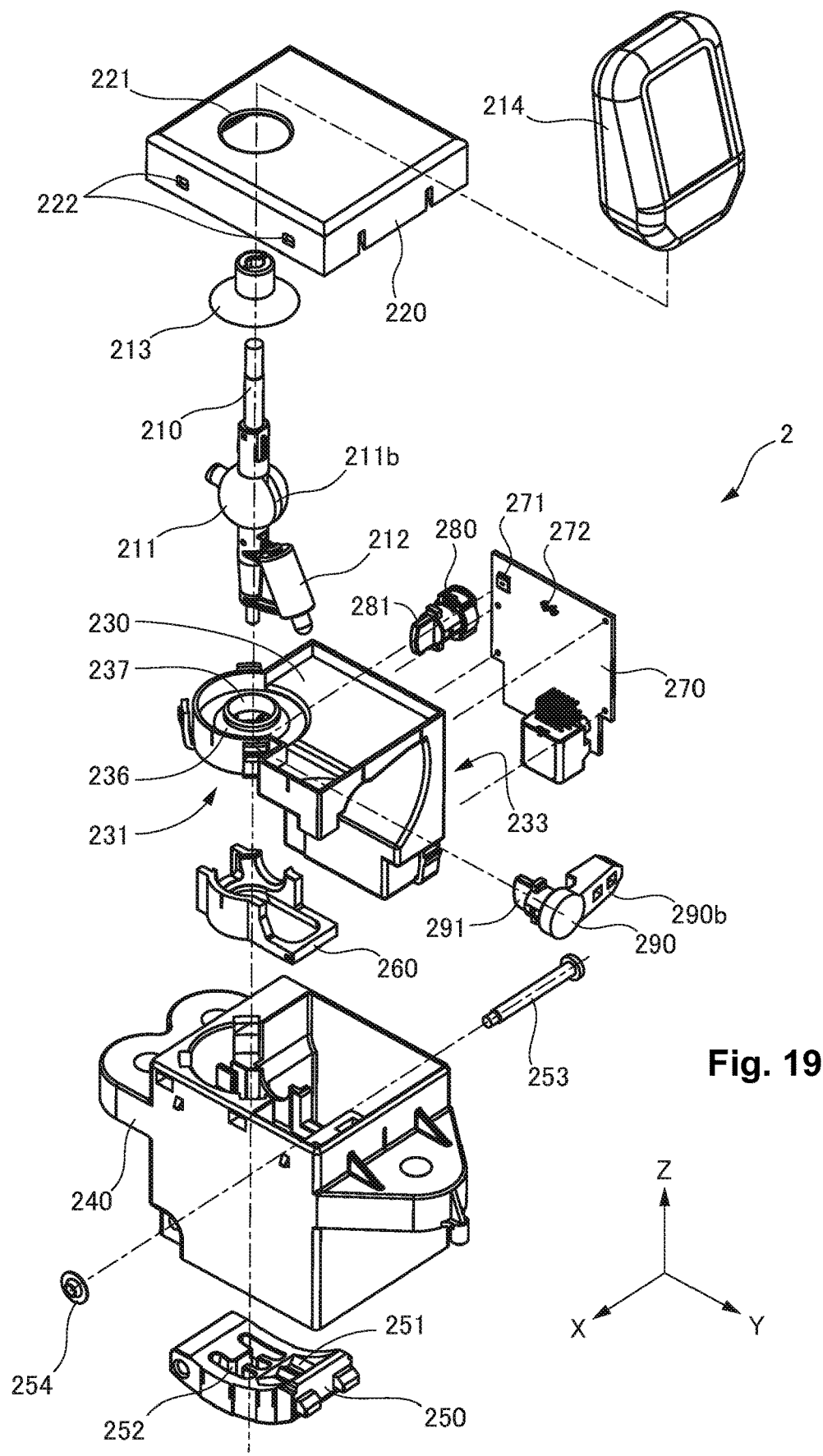
FIG. 19 is an exploded perspective view of the shifting device 2.

FIG. 19 is an exploded perspective view of the shifting device 2.

Figure 20:
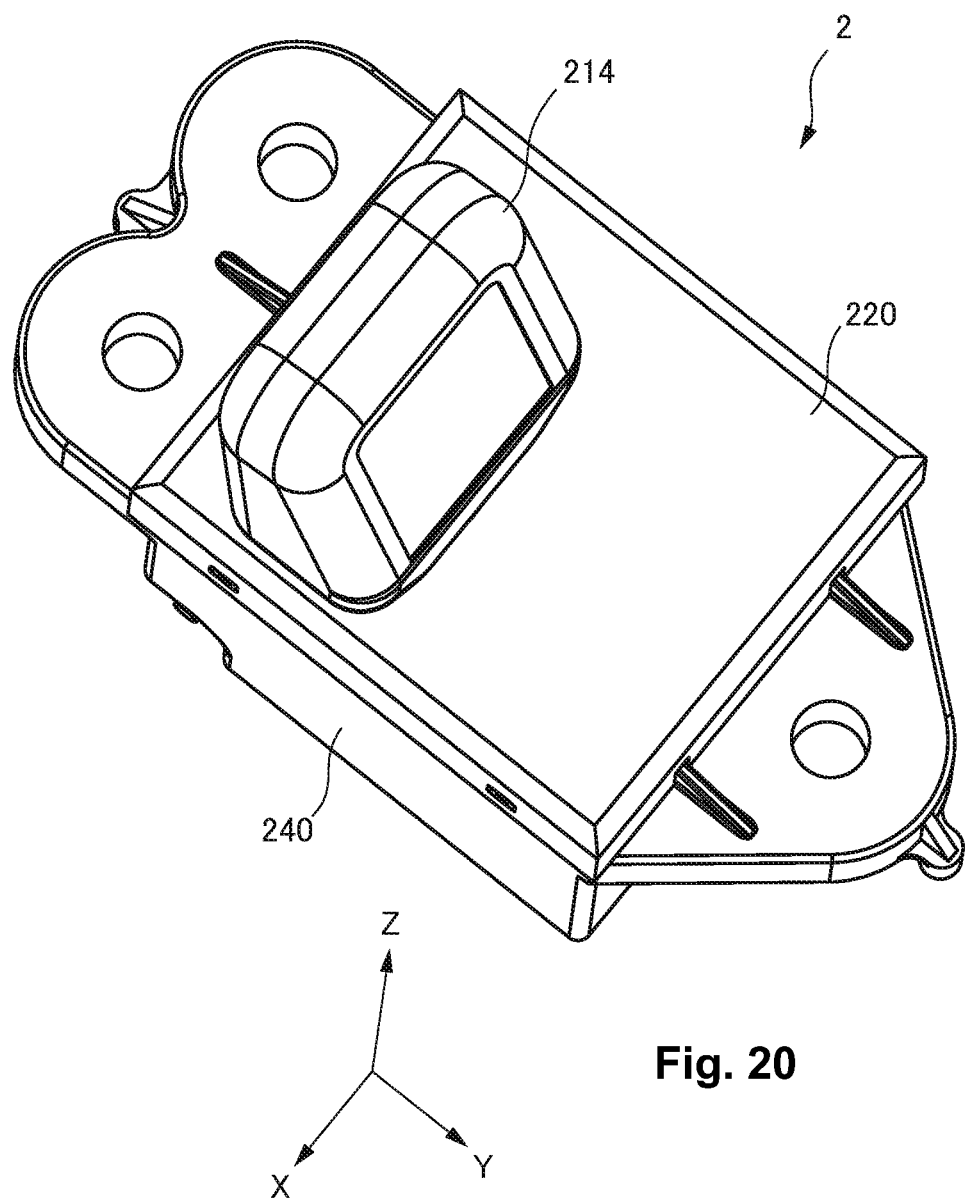
FIG. 20 is a perspective view of the shifting device 2 seen from a different angle.

FIG. 20 is a perspective view of the shifting device 2 seen from a different angle.

Figure 21:
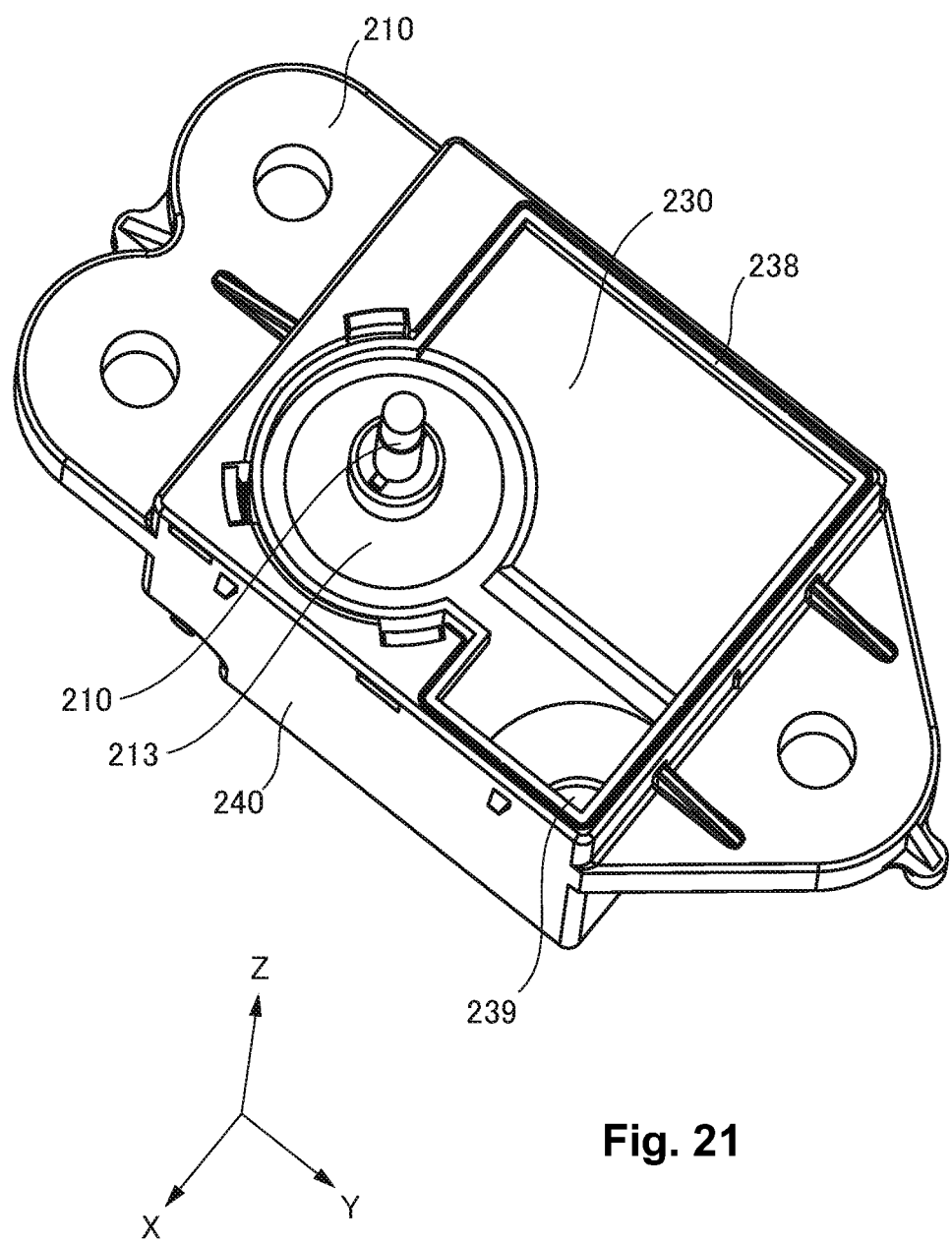
FIG. 21 is a perspective view of the shifting device 2 with the knob 214 and the bezel 220 in FIG. 20 are removed.

FIG. 21 is a perspective view of the shifting device 2 with the knob 214 and the bezel 220 in FIG. 20 are removed.

Figure 22:
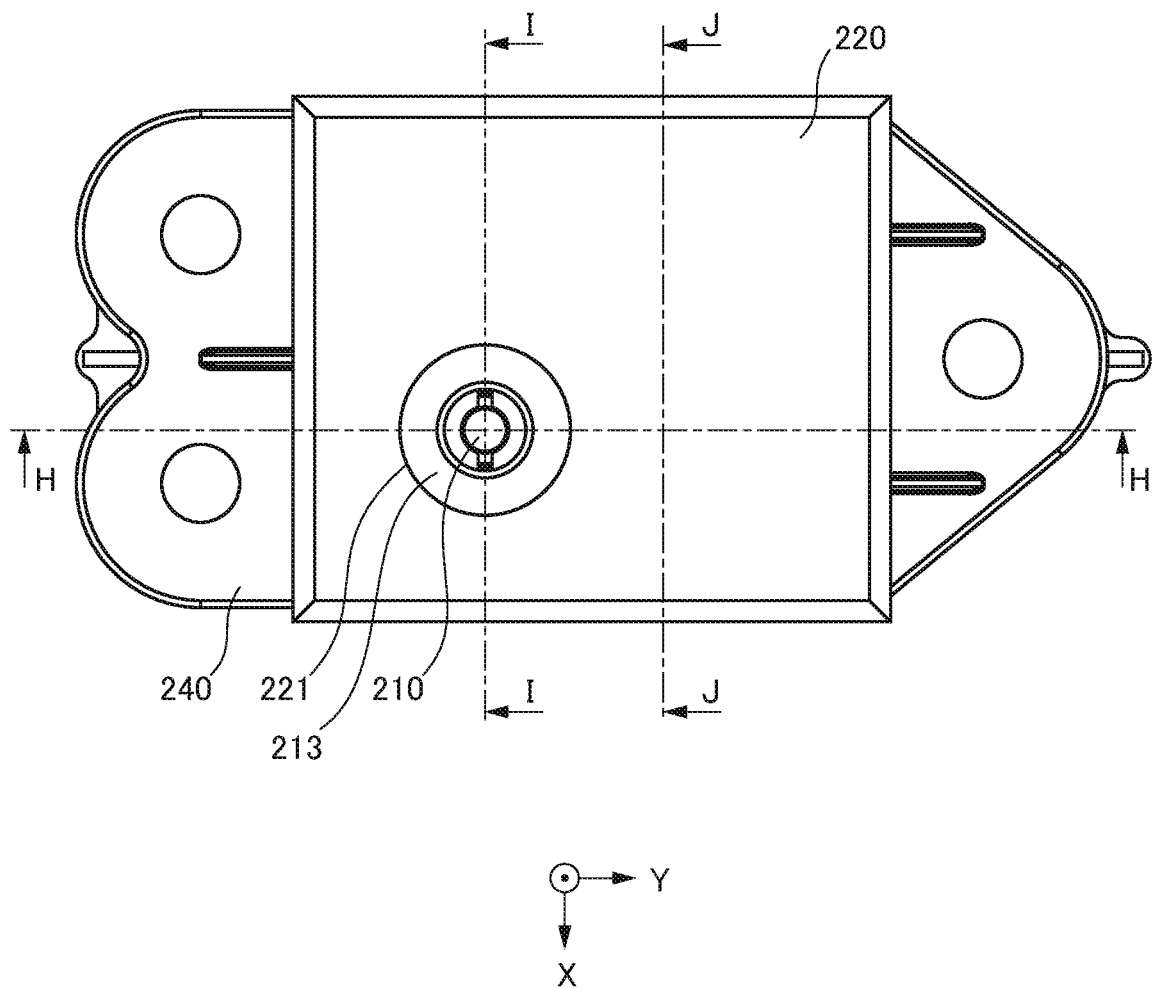
FIG. 22 is an upper view of the shifting device 2 with the knob 214 is removed.

FIG. 22 is an upper view of the shifting device 2 with the knob 214 is removed.

Figure 23:
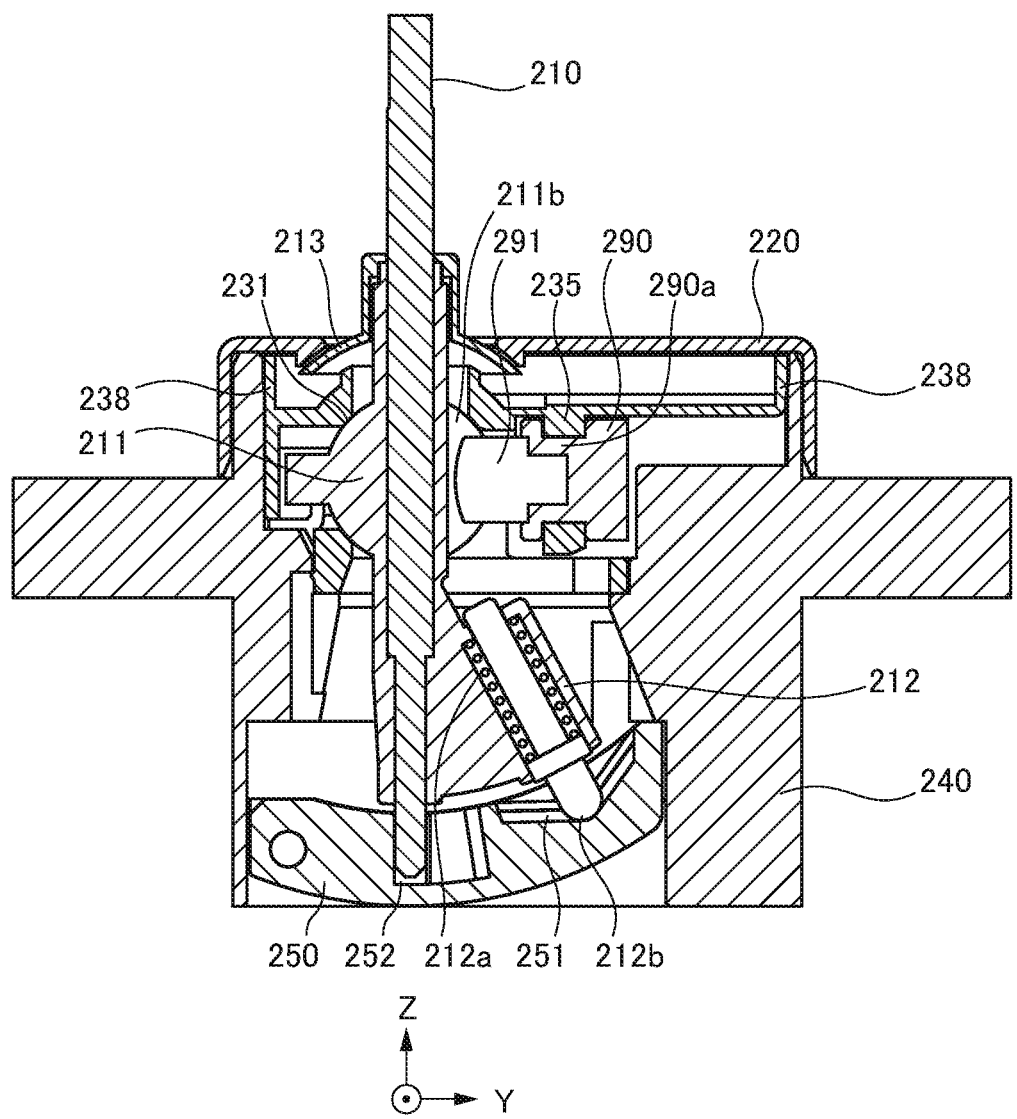
FIG. 23 is a sectional view of the shifting device 2 taken along line indicated by an arrow H-H in FIG. 22.

FIG. 23 is a sectional view of the shifting device 2 taken along line indicated by an arrow H-H in FIG. 22.

Figure 24:
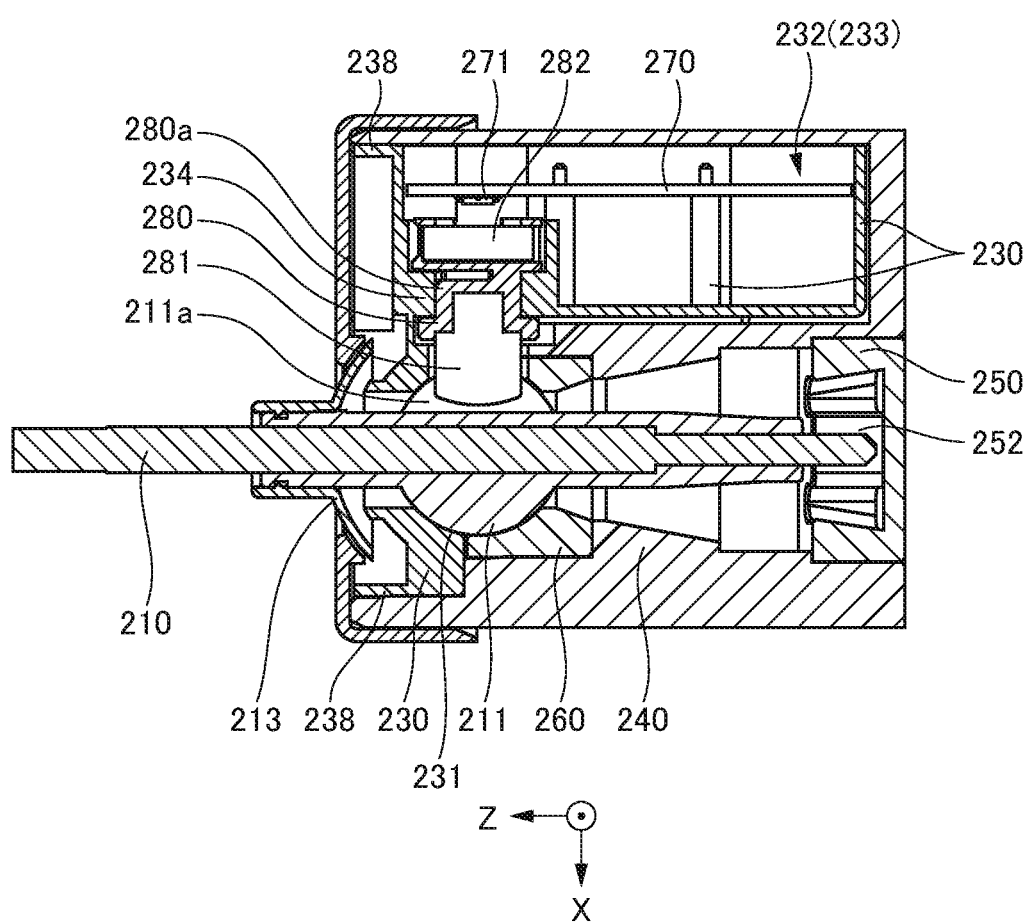
FIG. 24 is a sectional view of the shifting device 2 taken along line indicated by an arrow I-I in FIG. 22.

FIG. 24 is a sectional view of the shifting device 2 taken along line indicated by an arrow I-I in FIG. 22.

Figure 25:
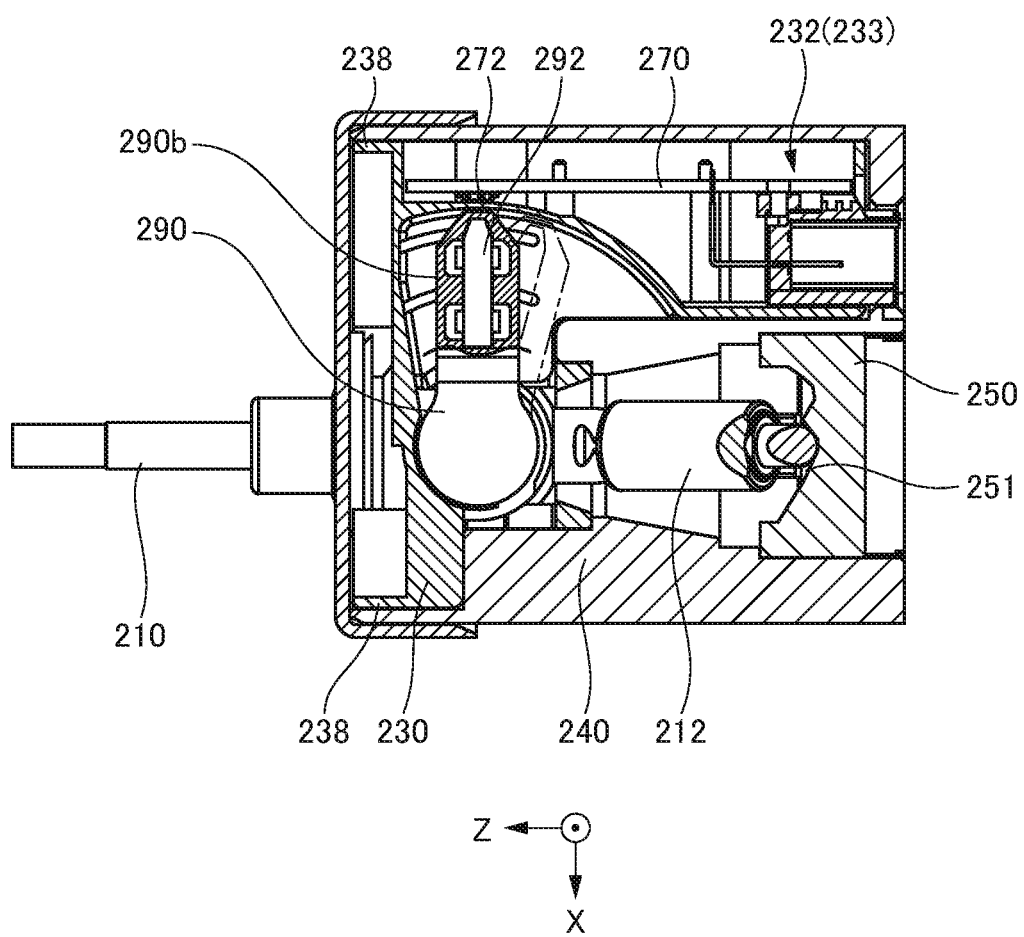
FIG. 25 is a sectional view of the shifting device 2 taken along line indicated by an arrow J-J in FIG. 22.

FIG. 25 is a sectional view of the shifting device 2 taken along line indicated by an arrow J-J in FIG. 22.

Figure 26:
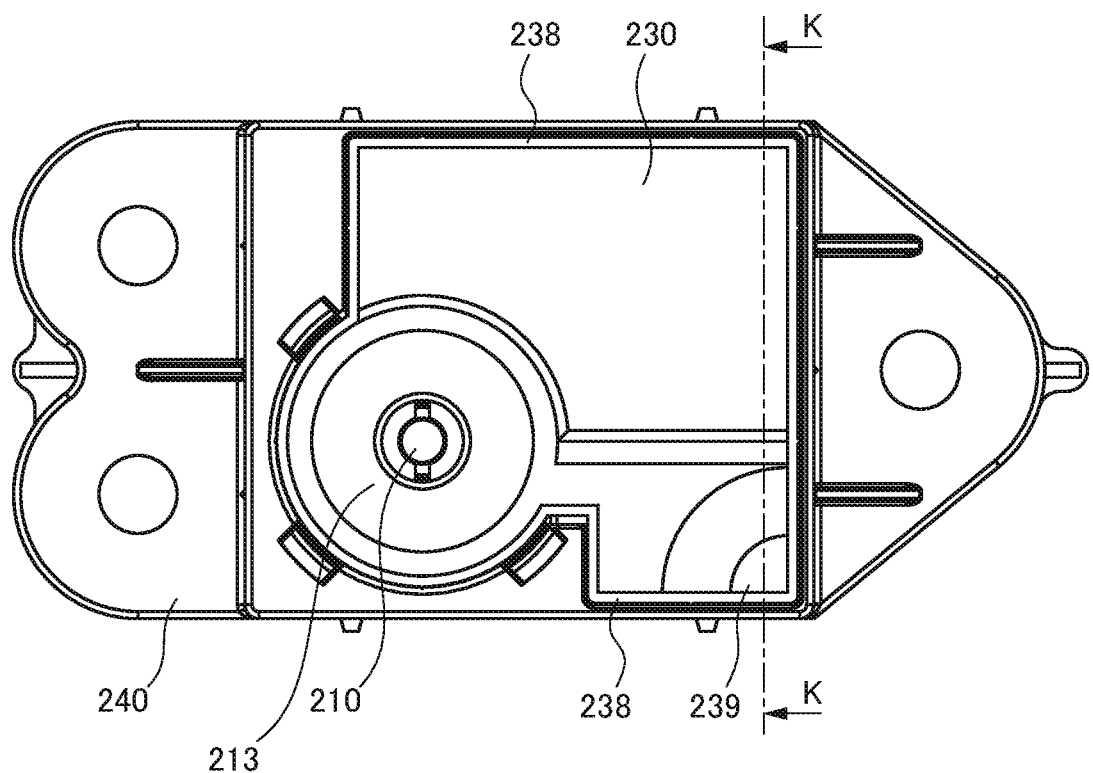
FIG. 26 is an upper view of the shifting device 2 with the bezel 220 in FIG. 22 is further removed.
Figure 26:
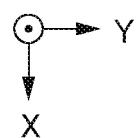

FIG. 26 is an upper view of the shifting device 2 with the bezel 220 in FIG. 22 is further removed.

Figure 27:
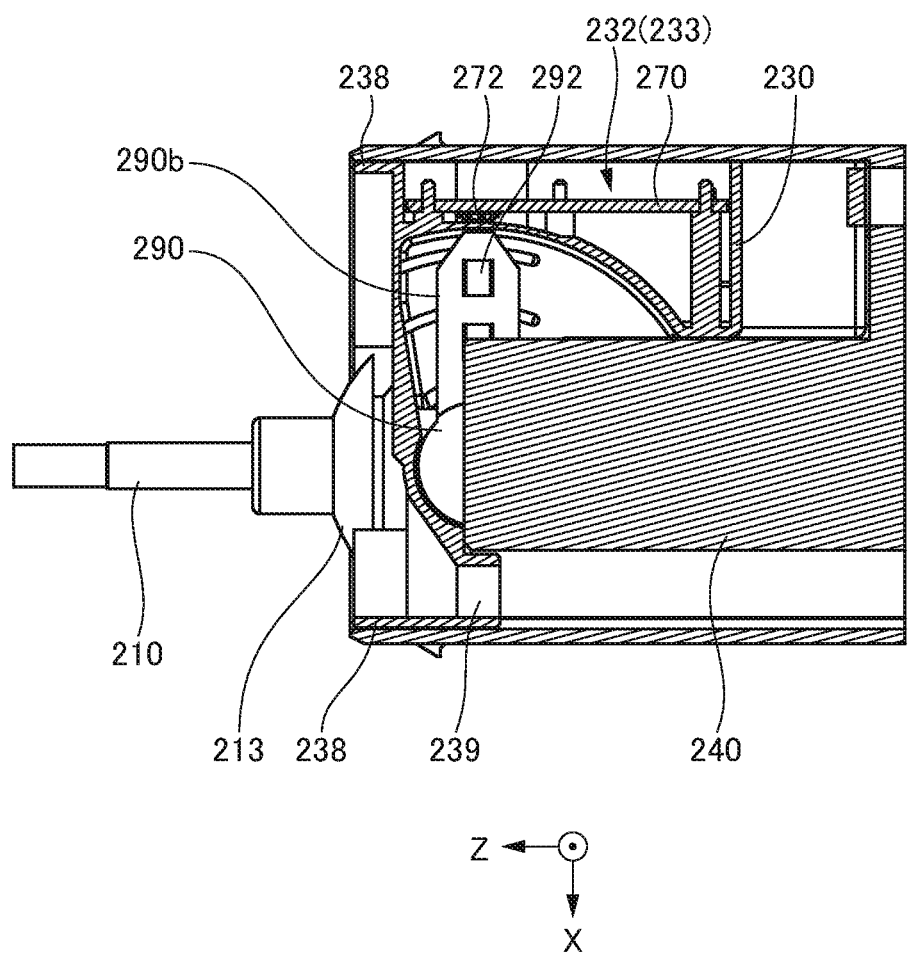
FIG. 27 is a sectional view of the shifting device 2 taken along line indicated by an arrow K-K in FIG. 26.

FIG. 27 is a sectional view of the shifting device 2 taken along line indicated by an arrow K-K in FIG. 26.

The shifting device 2 includes a shift lever 210, the bezel 220, a base member 230, a casing 240, a guide case 250, a holder 260, a circuit board 270, a rotor member 280, and a lever member 290, and is mounted on a vehicle to shift a shift position of the vehicle.

Here, descriptions for components having the same functions as in the first embodiment described above shall be omitted if not necessary.

The shift lever 210 is a lever that can be operated by a driver, and held by the base member 230 and the holder 260 in a manner swingable taking a ball section 211 provided below (in a negative Z side) as a fulcrum. A direction in which the shift lever 210 is allowed to swing is restricted to a direction guided by a guide groove 252 provided for the guide case 250 that will be described later. Specifically, the direction in which the shift lever 210 is allowed to swing is restricted to the selecting direction in which an upper end (positive Z side end) of the shift lever 210 moves in the X direction, and the shifting direction in which the upper end (positive Z side end) of the shift lever 210 moves in the Y direction.

The ball section 211 is integrated with the shift lever 210 by the shift lever 210 being inserted therethrough, and has a substantial spherical outer shape. The ball section 211 is provided with engagement grooves 211*a* and 211*b* opening in a slit shape respectively on the negative X side and the positive Y side.

With the engagement groove 211*a*, an engagement piece 281 that will be later described is slidably engaged. Further, with the engagement groove 211*b*, an engagement piece 291 that will be later described is slidably engaged.

Moreover, to the ball section 211, a click member 212 is attached. As illustrated in FIG. 23, the click member 212 is provided with a bias member 212*a* and a contact pin 212*b*. The guide case 250 is provided with click grooves 251 at positions corresponding to the swing positions of the shift lever 210. The contact pin 212*b* provided at a tip end of the click member 212 is in contact with the click grooves 251 in a biased manner. When the shift lever 210 is operated, as the click member 212 moves to an adjacent one of the click grooves 251, it is possible to provide an appropriate sense of resistance (clicking feeling) in operation, and thus to improve operational feeling. Further, an operational position of the shift lever 210 may be held by the engagement between the click member 212 and the click grooves 251.

The shift lever 210 also includes a guide cover 213 fitting with the shift lever 210 and provided so as to cover a convex section 236 of the base member 230 that will be later described. The guide cover 213 is able to prevent a foreign matter from entering a through hole 237 in the convex section 236 from outside, and to guide the foreign matter to a peripheral section of the convex section 236.

Other than an operating portion of the shift lever 210, the bezel 220 is disposed on a surface closest to the driver, and a through hole 221 through which the shift lever 210 is inserted is opening therein. The bezel 220 is attached to the casing 240 using a hook section 222 in a state in which the shift lever 210 is inserted through the through hole 221.

The base member 230 is contained in the casing 240, and includes, in its substantial center, a concave section 231 in which the ball section 211 along with the holder 260 is held thus to hold the shift lever 210 in a swingable manner. As illustrated in FIG. 19, the concave section 231 opens downward (negative Z side) and to a side opposite of the circuit board 270 (positive X side).

For a plane on the negative X side of the base member 230, there is provided a container section 233a having a container opening 232 opening to the negative X side. The container section 233 holds and accommodates the circuit board 270. As the container opening 232 opens to a direction opposite of the opening of the concave section 231, the concave section 231 and the container opening 232 may be provided by a single base member 230. Further, with the casing 240 that will be later described, it is possible to easily provide a configuration in which the concave section 231 and the container opening 232 are fully covered.

The base member 230 further includes a first pivotally-supporting section 234 and a second pivotally-supporting section 235 respectively pivotally-supporting the rotor member 280 and the lever member 290 in a turnable manner.

The first pivotally-supporting section 234 pivotally-supports a shaft section 280a of the rotor member 280 in a manner turnable following swinging of the shift lever 210 in the shifting direction.

The second pivotally-supporting section 235 pivotally-supports a shaft section 290a of the lever member 290 in a manner turnable following swinging of the shift lever 210 in the selecting direction.

Similarly to the first embodiment, the first pivotally-supporting section 234 and the second pivotally-supporting section 235 are provided in a shape in which cut-out openings are connected, each of the cut-out openings is an opening defining a shape of circle with a portion convex peripherally outward. The rotor member 280 and the lever member 290 are attached by positioning and inserting corresponding retaining sections of the rotor member 280 and the lever member 290 respectively in the cut-out openings.

Further, the base member 230 is provided with the convex section 236 corresponding to the concave section 231 on a side opposite of the concave section 231. The through hole 237 opens in the convex section 236, and the shift lever 210 is disposed through the through hole 237. The base member 230 is also provided with a wall section 238 and a discharge section 239.

The wall section 238 is provided in order to prevent the foreign matter guided by the guide cover 213 from moving outside the base member 230, and projects to the positive Z side so as to cover all around an upper surface of the base member 230 (positive Z side surface).

The discharge section 239 is a discharge outlet for discharging foreign matters provided in order to discharge the foreign matter guided to the upper surface of the base member 230 by the guide cover 213 outside the base member 230. In this embodiment, the discharge section 239 opens so as to discharge the foreign matter downward. A discharge route further on is provided in a manner fully surrounded by the casing 240, and a foreign matter may not come closer to the circuit board 270 or the like.

In this embodiment, the guide cover 213 covers the opening (the through hole 237) of the base member 230 to prevent foreign matters such as water and dust from entering the base member 230, and the wall section 238 and the discharge section 239 guide the foreign matters outside the base member 230. Thus, it is possible to ensure prevention of foreign matters from entering the shifting device 2.

The casing 240 includes a box section opening upward (positive Z side) so as to accommodate, along with the circuit board 270, the base member 230 to which the circuit board 270 is attached. Further, casing 240 is in a box shape opening downward (negative Z side), where the guide case 250 is attached.

In a plane on an upward side (positive Z side) of the guide case 250, the click grooves 251 are provided at the positions corresponding to the positions of the click member 212 that moves according to the shift position of the shift lever 210. Further, the guide groove 252 opens in the guide case 250, and the shift lever 210 is guided along the guide groove 252 to the plurality of operational positions. It should be noted that the guide groove 252 guides the shift lever 210 by contact, and the guide case 250 receives a load from the shift lever 210. Therefore, the guide case 250 is securely fixed to the casing 240 using a shaft 253 and a push nut 254.

The guide groove 252 guides the shift lever 210 to the plurality of operational positions. Specifically, similarly to the first embodiment, the guide groove 252 guides so as to restrict the swing range of the shift lever 210 to the shift positions including R position (reverse), D position (drive), N position (neutral), center position (the position illustrated in FIG. 1, and B position (inertia brake). B position may be L position (Low), M position (manual), or the like. As used herein, a swing direction in which the tip end of the shift lever 210 moves in the Y direction is referred to as a shifting direction (first swing direction), and a swing direction in which the tip end of the shift lever 210 moves in the X direction is referred to as a selecting direction (second swing direction).

The holder 260 is disposed at a position between the base member 230 and the casing 240, and together with the concave section 231 of the base member 230, holds the ball section 211.

The circuit board 270 is positioned within the container section 233 of the base member 230 so that its board surface is parallel with the YZ plane. The circuit board 270 is provided with hall sensors 271 and 272 as a detector member for detecting the swing direction of the shift lever 210, and the hall sensors 271 and 272 are disposed at positions at which the sensors are respectively allowed to face against a magnet 282 of the rotor member 280 and a magnet 292 of the lever member 290.

The hall sensor (first detector member) 271 detects a rotational angle of the magnet 282 when the rotor member 280 rotates according to swinging of the shift lever 210 in the shifting direction in a state in which the magnet 282 faces against the hall sensor 271. As the hall sensor 271, a hall IC is used, capable of detecting a change in an angle of a magnetic flux due to rotation of the magnet 282, and outputting, as a detection signal, a voltage corresponding to the detected angle of the magnetic flux.

By the hall sensor 271 detecting the rotational angle of the magnet 282, it is possible to determine whether the shift lever 210 has moved to the positive Y side or to the negative Y side in the shifting direction.

The hall sensors (second detector member) 272 detect whether or not the magnet 292 is at a facing position when the lever member 290 moves the magnet 292 either away from or closer to the hall sensors 272 according to swinging of the shift lever 210 in the selecting direction. As the hall sensors 272 only need to determine the presence of the magnet 292, a hall IC that only outputs ON or OFF.

By the hall sensors 272 detecting the position of the magnet 292, it is possible to determine whether the shift lever 210 has moved to the positive X side (either of R, N, and D) or to the negative X side (neutral position or B position) in the selecting direction.

Further, while the two hall sensors 272 are provided in this embodiment so that it is possible to perform detection even if there is a trouble with one of the sensors, only one hall sensor 272 may be provided.

The rotor member (first detection target member) 280 is pivotally-supported by the base member 230 in a turnable manner, and configured to turn following swinging of the shift lever 210 in the shifting direction. The rotor member 280 holds the magnet (detection target section) 282 at one end section (end section on the negative X side) in a manner rotatable in a plane vertical to the rotational axis of the shift lever 210 in the shifting direction (in the YZ plane). The magnet 282 is provided for the rotor member 280 such that both of its N pole and S pole face against the hall sensor 271.

To the other end section of the rotor member 280 (end section on the positive X side), the engagement piece 281 is fixed. The engagement piece 281 is engaged with the engagement groove 211a provided in the direction of the operational axis of the shift lever 210, and rotates following movement of the shift lever 210 in the shifting direction.

The lever member (second detection target member) 290 is pivotally-supported by the base member 230 in a turnable manner, and configured to turn following swinging of the shift lever 210 in the selecting direction. The lever member 290 holds the magnet (detection target section) 292 at one end section of an arm section 290b (end section on the negative X side) extending in a direction vertical to the rotational axis of the selecting direction. In this embodiment, the magnet 292 is provided for the lever member 290 so as to face against the hall sensors 272 when the shift lever 210 is in the center position. To the other end section of the lever member 290 (end section on the positive X side), the engagement piece 291 is fixed. The engagement piece 291 is engaged with the engagement groove 211b provided in the direction of the operational axis of the shift lever 210, and rotates following movement of the shift lever 210 in the selecting direction.

The magnet 292 of this embodiment is configured such that its N pole is on a tip end side (a side closer to the hall sensors 272), and a side of the N pole (tip end side) is configured thinner than a side of an S pole so as to facilitate determination of a polar direction. It should be noted that if the hall sensors 272 are for S pole, the S pole may be on the tip end side of the magnet 292.

As described above, the rotor member 280 and the lever member 290 are connected to the ball section 211 respectively via the engagement piece 281 and the engagement piece 291, and therefore the rotor member 280 and the lever member 290 are able to rotate independently from each other without hindering the movement of the shift lever 210 in the shifting direction and the selecting direction.

As described above, according to this embodiment, while basically employing the same configuration as that in the first embodiment, the ball section 211 is disposed at the position closer to the bezel 220 so as to minimize the opening on the upper side. Further, in this embodiment, the guide cover 213 covers the opening (the through hole 237) of the base member 230 to prevent foreign matters such as water and dust from entering the base member 230, and the wall section 238 and the discharge section 239 guide the foreign matters outside the base member 230. Thus, with the shifting device 2 according to this embodiment, in addition to the effects similarly to the first embodiment, it is possible to ensure prevention of foreign matters from entering the shifting device 2 and to improve reliability of the device.

Third Embodiment

Figure 28:
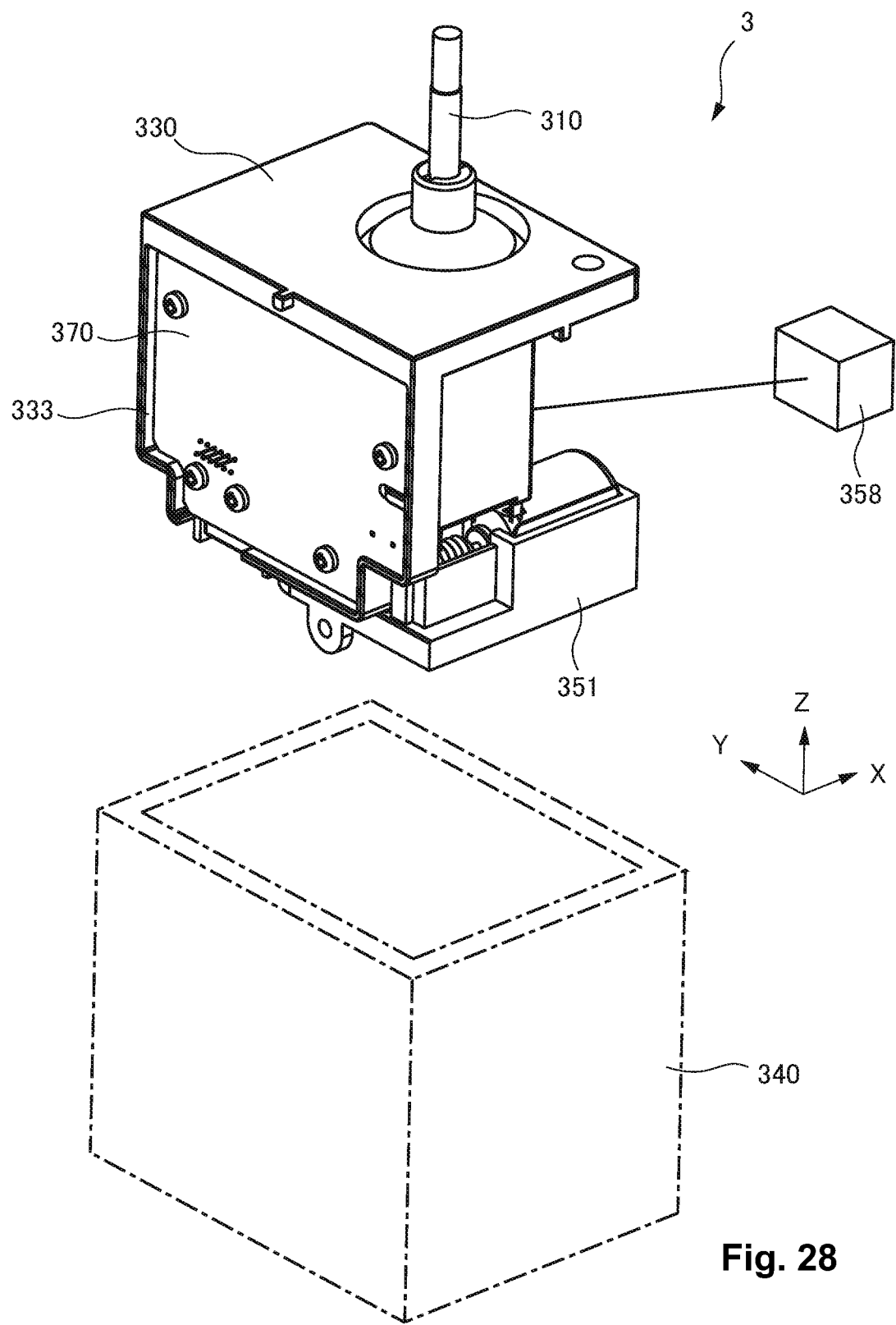
FIG. 28 is a perspective view illustrating an embodiment of a shifting device 3 according to the present invention.

FIG. 28 is a perspective view illustrating an embodiment of a shifting device 3 according to the present invention.

In FIG. 28, a bezel 320 is omitted and not shown.

Further, while an XYZ orthogonal coordinate system is provided in the drawings listed below including FIG. 28 in order to facilitate illustration and understanding, this is not for indicating absolute coordinates, but merely for showing common orientation in the drawings.

Figure 29:
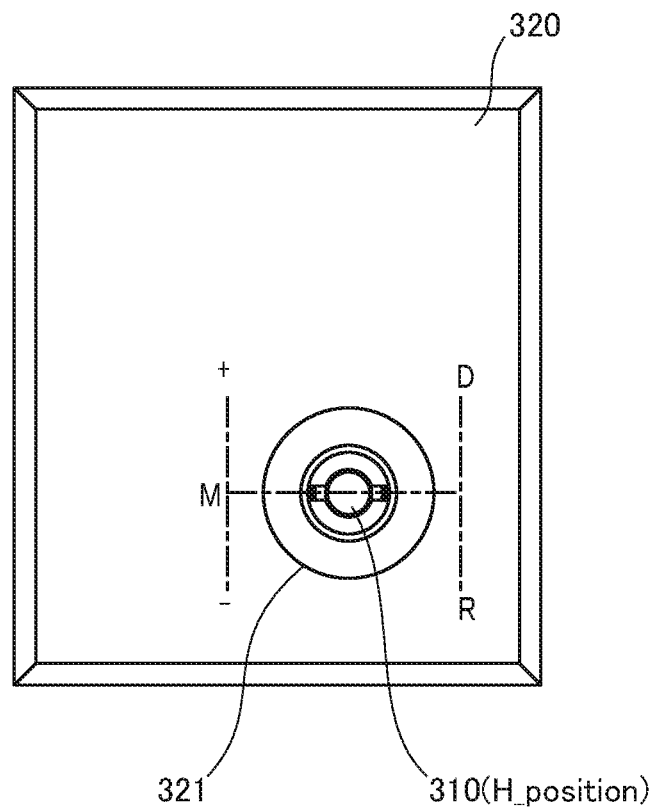
FIG. 29 is a view illustrating the shifting device 3 with a bezel 320 attached.

FIG. 29 is a view illustrating the shifting device 3 with a bezel 320 attached.

Figure 30:
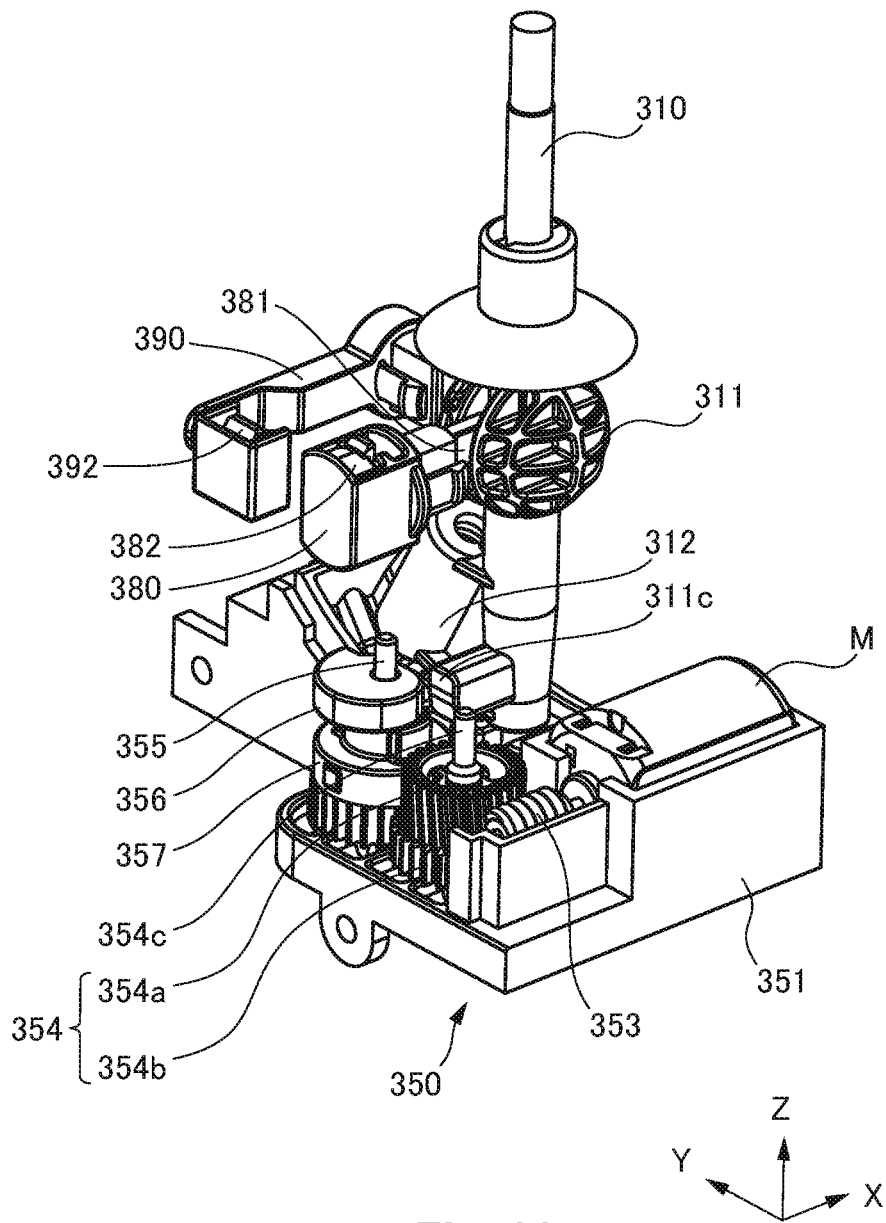
FIG. 30 is a perspective view illustrating a main part of the shifting device 3.

FIG. 30 is a perspective view illustrating a main part of the shifting device 3.

Figure 31:
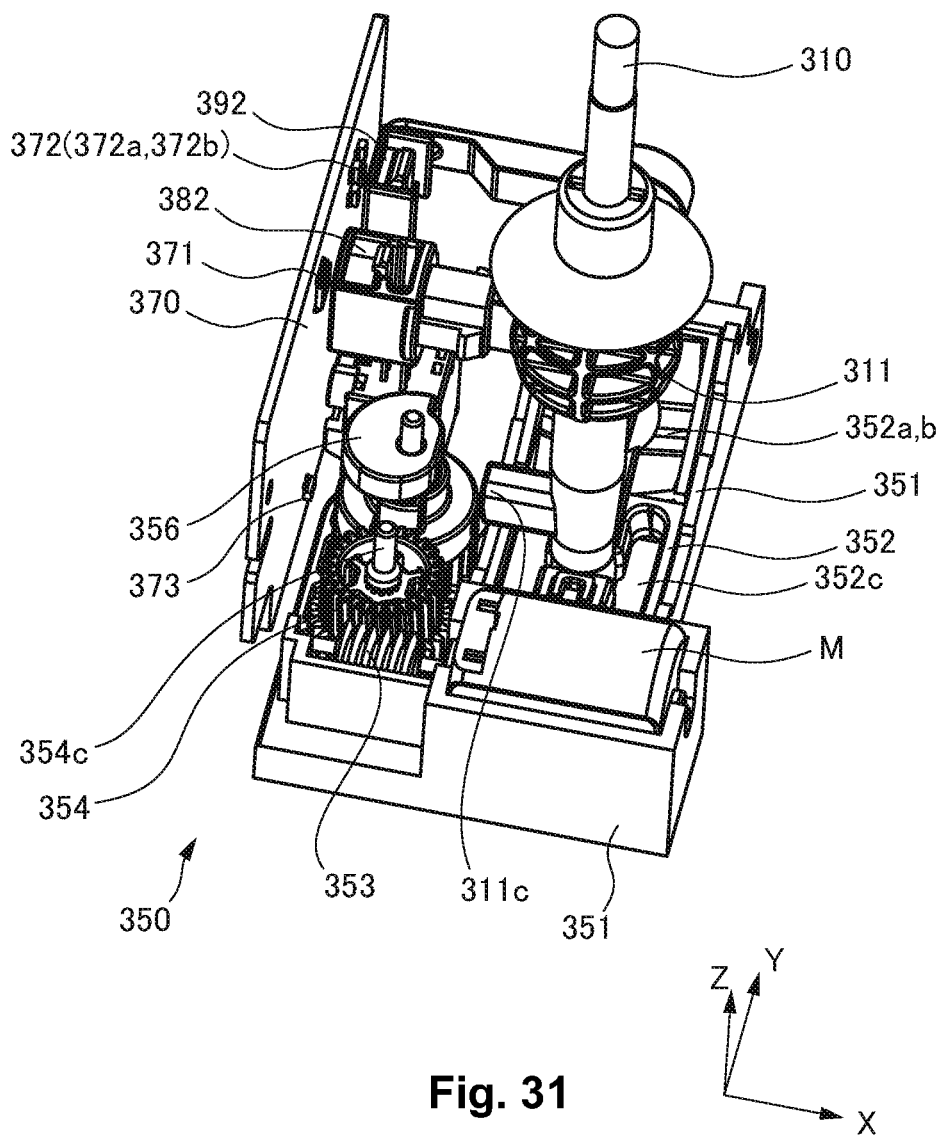
FIG. 31 is a perspective view illustrating the main part of the shifting device 3.

FIG. 31 is a perspective view illustrating the main part of the shifting device 3.

Figure 32:
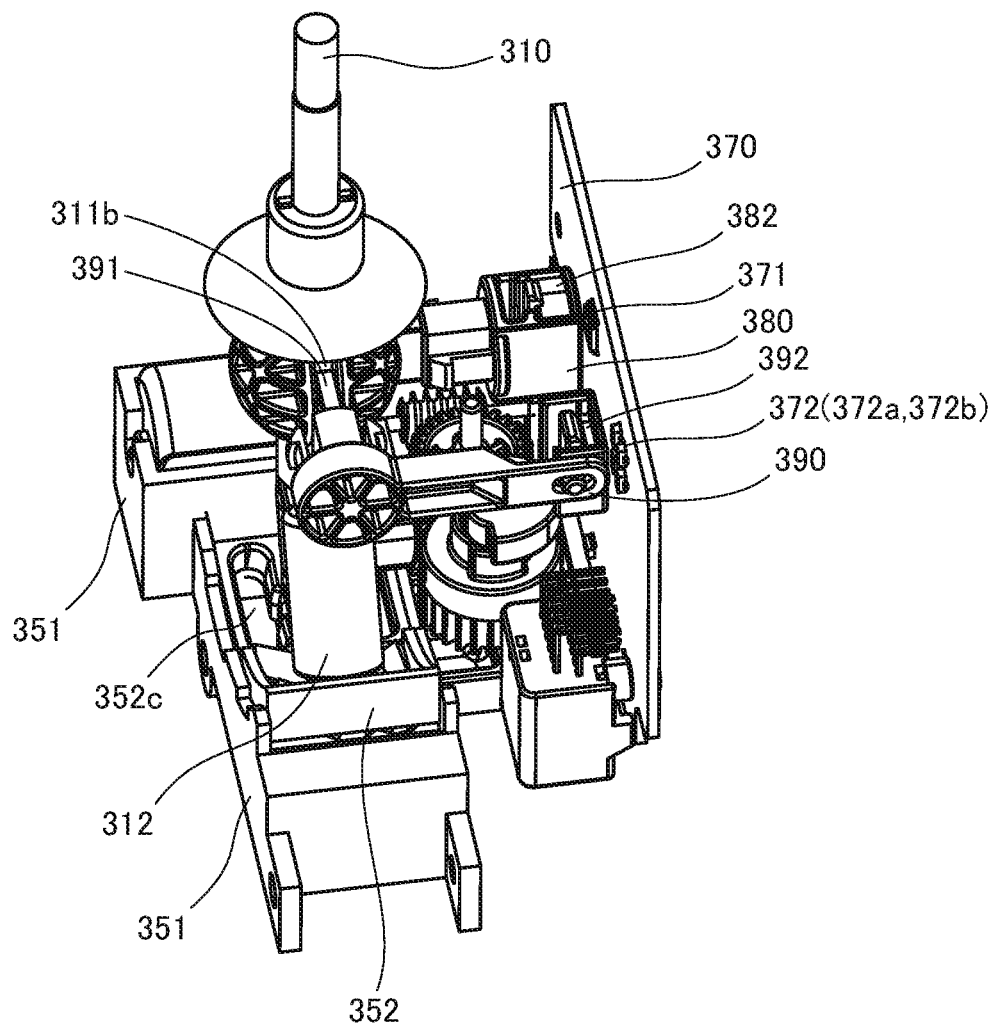
FIG. 32 is a perspective view illustrating the main part of the shifting device 3.

FIG. 32 is a perspective view illustrating the main part of the shifting device 3.

Figure 33:
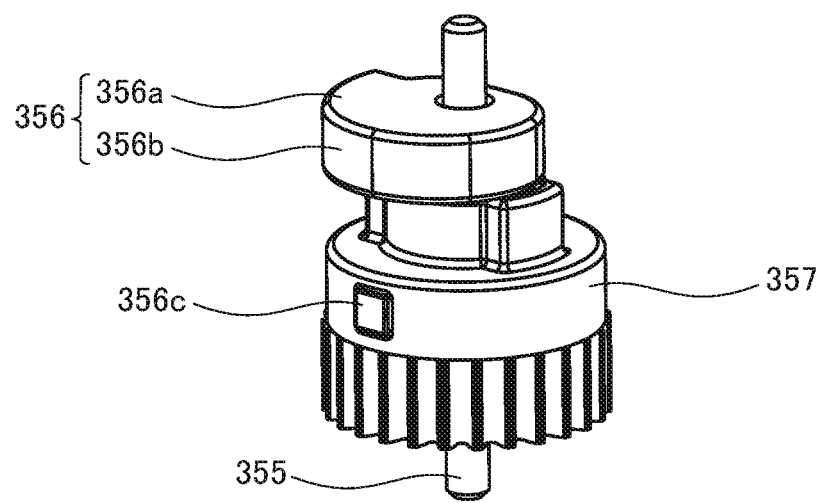
FIG. 33 is a perspective view illustrating a restricting member 356.
Figure 33:
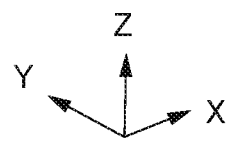

FIG. 33 is a perspective view illustrating a restricting member 356.

Figure 34:
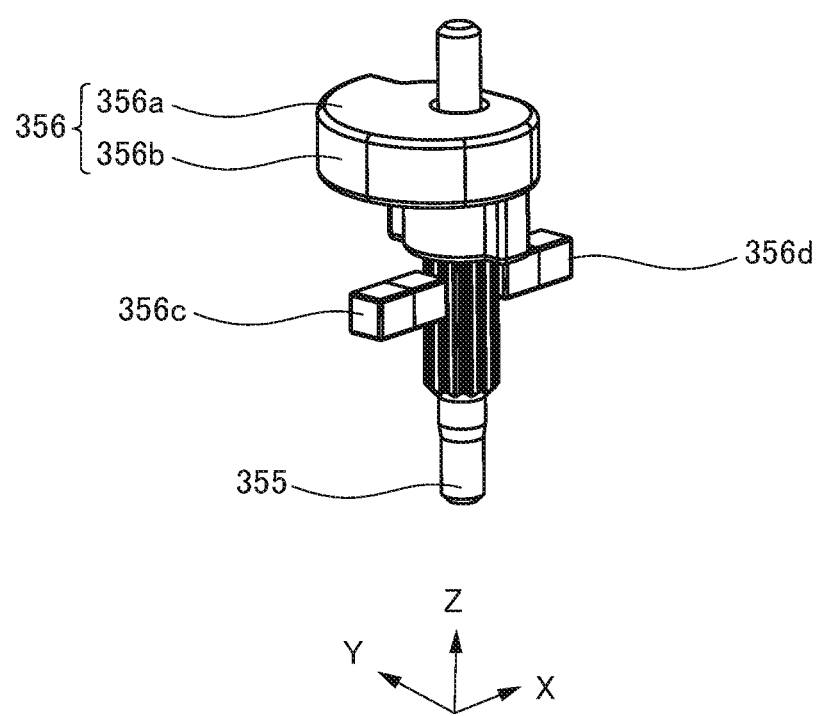
FIG. 34 is a perspective view illustrating a state in which a restricting gear 357 is removed from the restricting member 356 shown in FIG. 33.

FIG. 34 is a perspective view illustrating a state in which a restricting gear 357 is removed from the restricting member 356 shown in FIG. 33.

Figure 35:
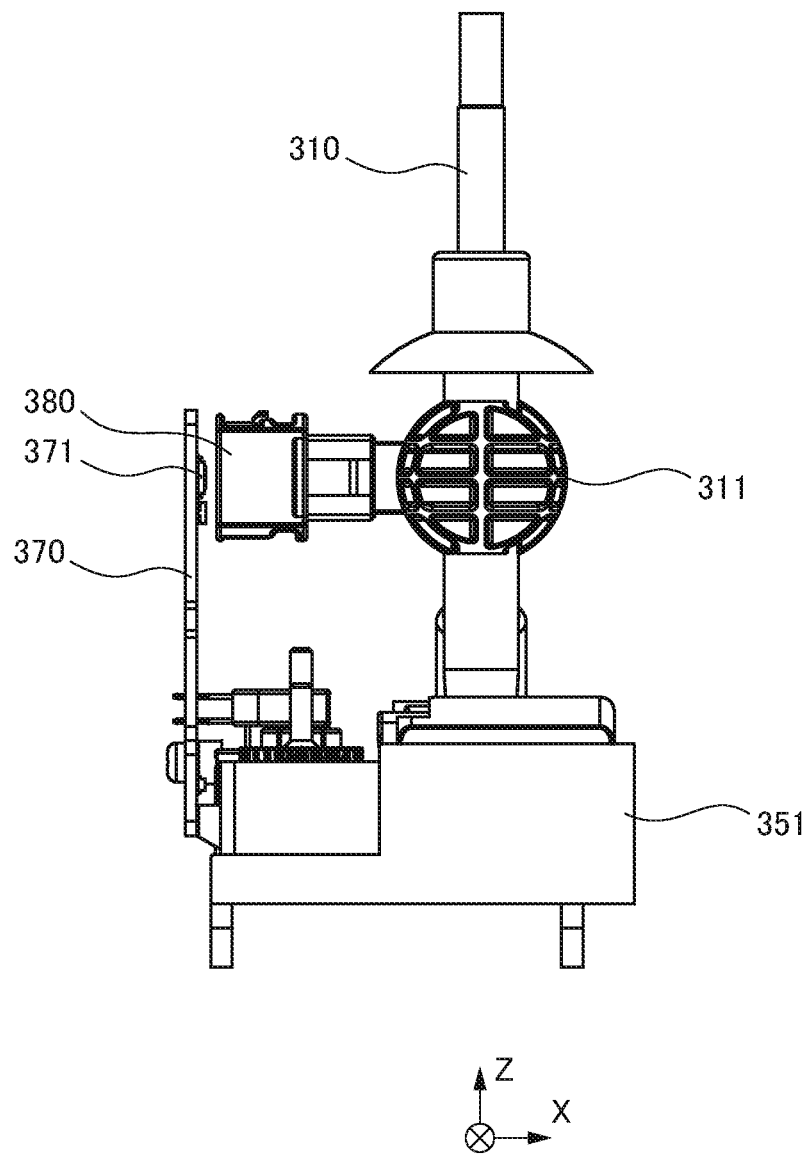
FIG. 35 is a side view of the main part of the shifting device 3 seen from a negative Y side.

FIG. 35 is a side view of the main part of the shifting device 3 seen from a negative Y side.

Figure 36:
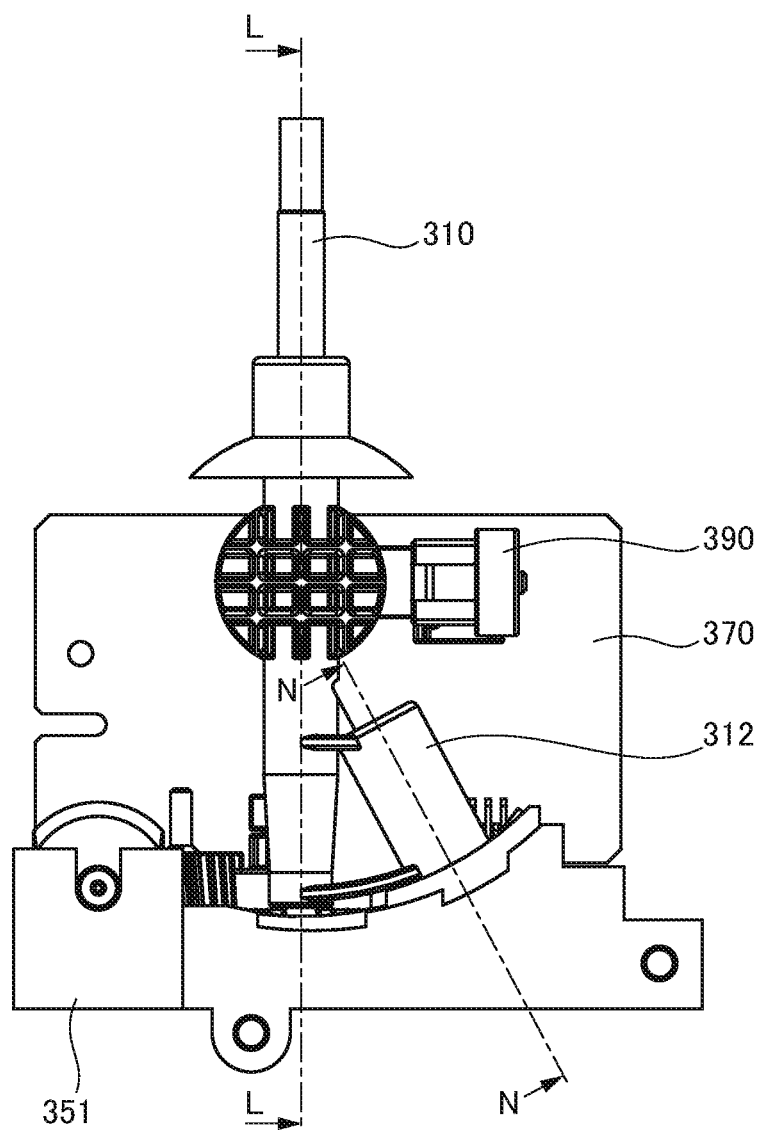
FIG. 36 is a side view of the main part of the shifting device 3 seen from a positive X side.

FIG. 36 is a side view of the main part of the shifting device 3 seen from a positive X side.

Figure 37:
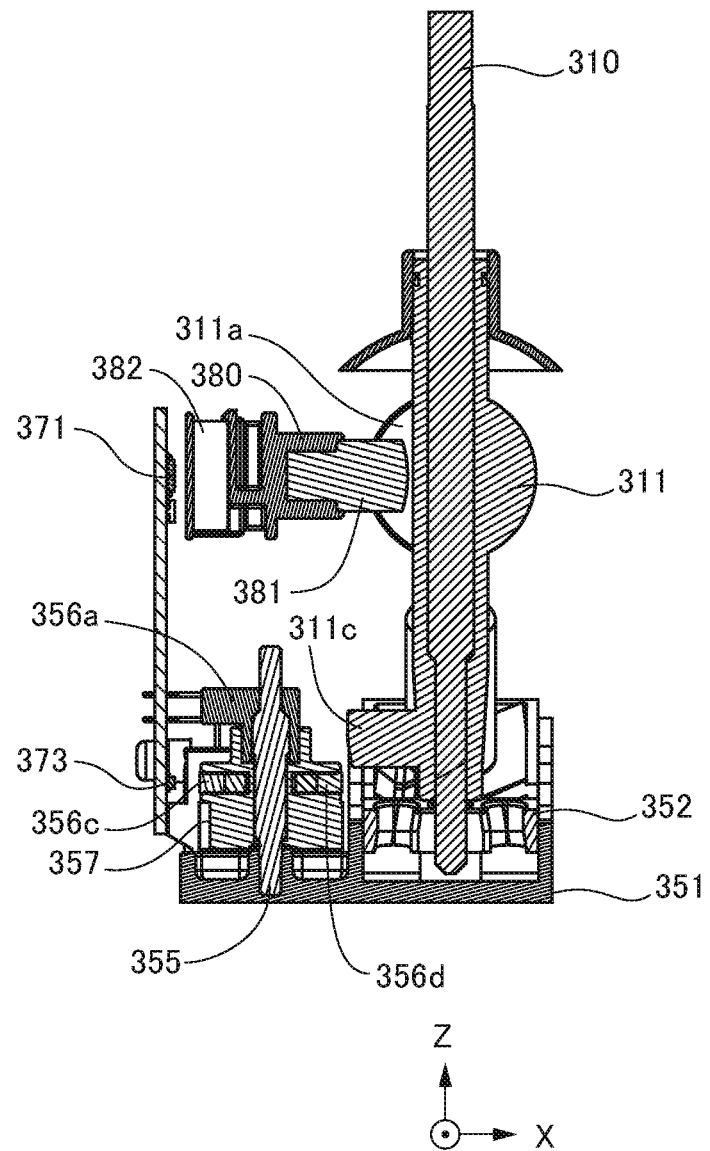
FIG. 37 is a sectional view of the main part of the shifting device 3 taken along line indicated by an arrow L-L in FIG. 36.

FIG. 37 is a sectional view of the main part of the shifting device 3 taken along line indicated by an arrow L-L in FIG. 36.

Figure 38:
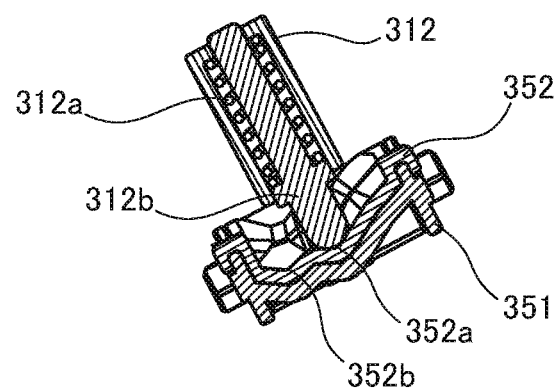
FIG. 38 is a sectional view of a shift lever holding mechanism taken along line indicated by an arrow N-N in FIG. 36 in a state in which a shift lever 310 is in a home position.

FIG. 38 is a sectional view of a shift lever holding mechanism taken along line indicated by an arrow N-N in FIG. 36 in a state in which a shift lever 310 is in a home position.

Figure 39:
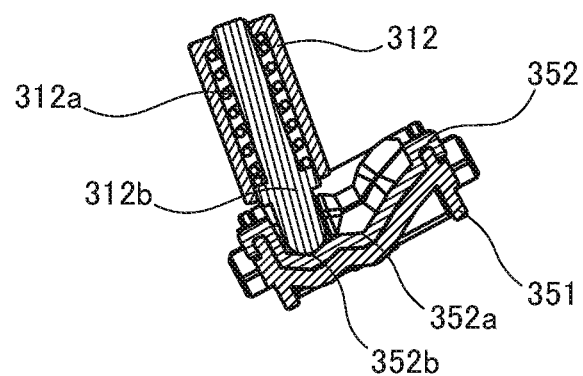
FIG. 39 is a sectional view of the shift lever holding mechanism taken along line indicated by the arrow N-N in FIG. 36 in a state in which the shift lever 310 is in a manual operation position.

FIG. 39 is a sectional view of the shift lever holding mechanism taken along line indicated by the arrow N-N in FIG. 36 in a state in which the shift lever 310 is in a manual operation position.

It should be noted that the drawings listed below are schematic illustration, and sizes and shapes of components are shown emphasized and not to scale as needed in order to facilitate understanding.

Further, while reference is made to specific values, shapes, materials, and the like in the following description, these specifics may be altered as needed.

The shifting device 3 includes the shift lever 310, the bezel 320, a base member 330, a casing 340, a shift lever restricting mechanism 350, a circuit board 370, a rotor member 380, and a lever member 390, and is mounted on a vehicle to shift a shift position of the vehicle.

Here, descriptions for components having the same functions as in the first embodiment and the second embodiment described above shall be omitted if not necessary.

The shift lever 310 is a lever that can be operated by a driver, and held by the base member 330 and the casing 340 in a manner swingable taking a ball section 311 provided below (in a negative Z side) as a fulcrum. A direction in which the shift lever 310 is allowed to swing is restricted to a direction guided by a guide groove 352c provided for a detent member 352 that will be described later. Specifically, the direction in which the shift lever 310 is allowed to swing is restricted to the selecting direction in which an upper end (positive Z side end) of the shift lever 310 moves in the X direction, and the shifting direction in which the upper end (positive Z side end) of the shift lever 310 moves in the Y direction.

The ball section 311 is integrated with the shift lever 310 by the shift lever 310 being inserted therethrough, and has a substantial spherical outer shape as a whole, although the outer shape includes holes for lightening. The ball section 311 is provided with engagement grooves 311a and 311b opening in a slit shape respectively on the negative X side and the positive Y side.

With the engagement groove 311a, an engagement piece 381 that will be later described is slidably engaged. Further, with the engagement groove 311b, an engagement piece 391 that will be later described is slidably engaged.

Moreover, to the ball section 311, a click member 312 constituting a shift lever holding mechanism is attached. As illustrated in FIG. 38 and FIG. 39, the click member 312 is provided with a bias member 312a and a contact pin 312b. The detent member 352 attached to a gear base member 351 is provided with click grooves 352a and 352b at positions corresponding to the swing positions of the shift lever 310. The contact pin 312b provided at a tip end of the click member 312 is in contact with the click grooves 352a and 352b in a biased manner. When the shift lever 310 is operated from the home position to the manual operation position, the click member 312 moves from a position shown in FIG. 38 to a position shown in FIG. 39, and the contact pin 312b also moves from the click groove 352a to the click groove 352b. Accordingly, it is possible to provide an appropriate sense of resistance (clicking feeling) in operation, and thus to improve operational feeling. Further, the operational position of the shift lever 310 may be held by the engagement between the contact pin 312b and the click groove 352a or 352b, and thus functioning as a shift lever holding mechanism.

Moreover, a part of the shift lever 310 extending down (negative Z side) below the ball section 311 is provided with a lever-side contact section 311c projecting to the negative X side. The lever-side contact section 311c is provided at a position at which the lever-side contact section 311c may be brought in contact with a contact section 356b of a cam section 356a that will be later described.

Other than an operating portion of the shift lever 310, the bezel 320 is disposed on a surface closest to the driver, and a through hole 321 through which the shift lever 310 is inserted is opening therein. The bezel 320 is attached to the casing 340 in a state in which the shift lever 310 is inserted through the through hole 321.

The base member 330 holds the ball section 311 in its substantial center, and thus holds the shift lever 310 in a swingable manner. The portion that holds the ball section 311 is provided so as to open to the negative Z side and the positive X side.

Further, the base member 330 includes a container section 333 for holding the circuit board 370. The container section 333 is provided for a negative X side surface of the base member 330 so as to open to the negative X side. As the container section 333 opens to a direction opposite of the opening of the portion that holds the ball section 311, the portion that holds the ball section 311 and the container section 333 may be provided by a single base member 330. Further, with the casing 340 that will be later described, it is possible to easily provide a configuration in which the concave section 31 and the container opening 32 are fully covered.

Further, the base member 330 pivotally-supports the rotor member 380 and the lever member 390 in a turnable manner.

The casing 340 is in a box shape opening upward (positive Z side) so as to accommodate, along with the circuit board 370, the base member 330 to which the circuit board 370 is attached. It should be noted that the structure of the casing 340 may not be limited to a structure having an opening as in this embodiment, and may be altered appropriately.

The shift lever restricting mechanism 350 includes the gear base member 351, the detent member 352, a worm 353, a transmission gear 354, a shaft 355, the restricting member 356, a restricting gear 357, and a motor M.

The gear base member 351 is provided at a lower section (negative Z side) of the shifting device 3, and fixed to the base member 330. The gear base member 351 is provided with a main part of the shift lever restricting mechanism 350.

The detent member 352 is attached to the gear base member 351, and provided with the click grooves 352a and 352b and the guide groove 352c. When the shift lever 310 is operated, the click grooves 352a and 352b provide clicking feeling according to the relation with the click member 312 described above. The guide groove 352c guides the shift lever 310 to the plurality of operational positions. Specifically, as illustrated in FIG. 29, the guide groove 352c guides so as to restrict the swing range of the shift lever 310 to the shift positions including R position (reverse), D position (drive), H position (home position, neutral position), M position (manual operation position), positive position (shift up), and negative position (shift down). As used herein, a swing direction in which the tip end of the shift lever 310 moves in the Y direction is referred to as a shifting direction (first swing direction), and a swing direction in which the tip end of the shift lever 310 moves in the X direction is referred to as a selecting direction (second swing direction).

The worm 353 is provided so as to rotate together with an output shaft of the motor M. The worm 353 meshes with a worm wheel 354a of the transmission gear 354.

The transmission gear 354 includes the worm wheel 354a and a gear section 354b, and is provided rotatably centering a gear shaft 354c.

As described above, the worm wheel 354a meshes with the worm 353, and the gear section 354b meshes with the restricting gear 357.

The gear shaft 354c extends in a direction parallel with a direction in which the shift lever 310 in the home position extends (direction of a Z axis).

The shaft (rotational shaft) 355 extends in the same direction as the gear shaft 354c, that is, parallelly with the direction in which the shift lever 310 in the home position extends (direction of the Z axis). The shaft 355 is provided with the restricting member 356 and the restricting gear 357 such that the restricting member 356 and the restricting gear 357 rotate together with the shaft 355. The shaft 355 is constituted as a magnetic body, magnets 356c and 356d that will be later described are attached to the restricting gear 357 using a pulling force due to a magnetic force to the shaft 355.

The restricting member 356 includes the cam section 356a, the contact section 356b, and the magnets 356c and 356d, and rotates together with the shaft 355 and the restricting gear 357.

The cam section 356a is an arc-like cam, eccentric with respect to a rotational center of the shaft 355. An arc-like surface of the cam section constitutes the contact section 356b that is brought into contact with the lever-side contact section 311c of the shift lever 310.

When the restricting member 356 rotates into the shift-restricting position, the contact section 356b is brought into contact with of the lever-side contact section 311c of the shift lever 310, and releases a holding state of the shift lever 310 by the shift lever holding mechanism (the click member 312 and the detent member 352) to return the shift lever 310 to the H position. Further, when the restricting member 356 is in the shift-restricting position, movement of the shift lever 310 to the M position is restricted by the lever-side contact section 311c being brought into contact with the contact section 356b.

After the cam section 356a and the restricting gear 357 are attached to the shaft 355, the magnets (detection target section) 356c and 356d are respectively inserted into two through holes opening in the restricting gear 357, and attached by the pulling force of the magnets 356c and 356d to the shaft 355. The magnet 356c and the magnet 356d are attached such that their polarities exposed from the restricting gear 357 are different from each other. As the magnets 356c and 356d rotate and change their positions by following rotation of the restricting member 356, the rotational position of the restricting member 356 may be detected based on the magnetic polarity detected by a hall sensor 373 that will be described later.

The restricting gear (third detection target member) 357 is attached to the shaft 355, and rotates together with the shaft 355 and the cam section 356a. The restricting gear 357 meshes with the gear section 354b of the transmission gear 354. Accordingly, as the motor M rotates, the restricting gear 357 also rotates to rotate the restricting member 356. Further, as described above, the magnets (detection target section) 356c are 356d are attached to the restricting gear 357.

A control section 358 refers to a result of the detection by the hall sensor 373, and commands a microcomputer that is not shown but mounted on the circuit board 370 to change the position of the restricting member 356 between the shift-restricting position and the released position. The microcomputer controls the motor M.

The motor M is an actuator that constitutes a drive source for driving the shift lever restricting mechanism 350. As described above, driving of the motor M is controlled by the control section 358 via the microcomputer mounted on the circuit board 370.

Based on the above configuration, the shift lever restricting mechanism 350 restricts movement of the shift lever 310 to the M position under a predetermined condition.

The circuit board 370 is positioned within the container section 333 of the base member 330 so that its board surface is parallel with the YZ plane. The circuit board 370 is provided with hall sensors 371 and 372 as a detector member for detecting the swing direction of the shift lever 310, and the hall sensors 371 and 372 are disposed at positions at which the sensors are respectively allowed to face against a magnet 382 of the rotor member 380 and a magnet 392 of 3 the lever member 390.

The hall sensor (first detector member) 371 detects a rotational angle of the magnet 382 when the rotor member 380 rotates according to swinging of the shift lever 310 in the shifting direction in a state in which the magnet 382 faces against the hall sensor 371. As the hall sensor 371, a hall IC, capable of detecting a change in an angle of a magnetic flux due to rotation of the magnet 382, and outputting, as a detection signal, a voltage corresponding to the detected angle of the magnetic flux, is used.

By the hall sensor 371 detecting the rotational angle of the magnet 382, it is possible to determine whether the shift lever 310 has moved to the positive Y side or to the negative Y side in the shifting direction.

The hall sensor (second detector member) 372 is configured by two pairs of the hall sensors 372a and 372b. The hall sensor 372 detects a moving position of the magnet 392 by the lever member 390 moving the magnet 392 away from and closer to the two pairs of the hall sensors 372a and 372b according to swinging of the shift lever 310 in the selecting direction. The hall sensor 372a is positioned on the positive Z side, and detects that the magnet 392 moves to the positive Z direction as the shift lever 310 is operated to the positive X side (M position). On the other hand, the hall sensor 372b is positioned on the negative Z side, and detects that the magnet 392 moves to the negative Z direction as the shift lever 310 is operated to the negative X side (R position or D position). When the shift lever 310 is in the H position, the shift lever 310 is positioned between the hall sensors 392a and 392b, and is not detected by either sensor.

By the hall sensor 372 detecting the position of the magnet 392, it is possible to determine whether the shift lever 310 has moved to the negative X side (R position or D position) in the selecting direction, the H position, or the positive X side (M position).

Further, the circuit board 370 is provided with the hall sensor (third detector member) 373 on a surface of the circuit board 370 that is the same as the surface on which the hall sensors 371 and 372 are mounted. The hall sensor 373 is disposed at a position at which the hall sensor 373 is allowed to face against the magnets (detection target section) 356c and 356d of the restricting gear (third detection target member) 357.

The hall sensor (third detector member) 373 is configured by a hall IC that is reactive to both N pole and S pole and configured to output different signals depending on the detected magnetic polarity, and detects the rotational position of the restricting member 356.

The rotor member (first detection target member) 380 is pivotally-supported by the base member 330 in a turnable manner, and configured to turn following swinging of the shift lever 310 in the shifting direction. The rotor member 380 holds the magnet (detection target section) 382 at one end section (end section on the negative X side) in a manner rotatable in a plane vertical to the rotational axis of the shift lever 310 in the shifting direction (in the YZ plane). The magnet 382 is provided for the rotor member 380 such that both of its N pole and S pole face against the hall sensor 371.

To the other end section of the rotor member 380 (end section on the positive X side), the engagement piece 381 is fixed. The engagement piece 381 is engaged with the engagement groove 311a provided in the direction of the operational axis of the shift lever 310, and rotates following movement of the shift lever 310 in the shifting direction.

The lever member (second detection target member) 390 is pivotally-supported by the base member 330 in a turnable manner, and configured to turn following swinging of the shift lever 310 in the selecting direction. The lever member 390 holds the magnet (detection target section) 392 at one end section of an arm section 390b (end section on the negative X side) extending in a direction vertical to the rotational axis of the selecting direction. In this embodiment, the magnet 392 is provided for the lever member 390 so as to face against the hall sensor 372 when the shift lever 310 is in the H position. To the other end section of the lever member 390 (end section on the positive X side), the engagement piece 391 is fixed. The engagement piece 391 is engaged with the engagement groove 311b provided in the direction of the operational axis of the shift lever 310, and rotates following movement of the shift lever 310 in the selecting direction.

As described above, the rotor member 380 and the lever member 390 are connected to the ball section 311 respectively via the engagement piece 381 and the engagement piece 391, and therefore the rotor member 380 and the lever member 390 are able to rotate independently from each other without hindering the movement of the shift lever 310 in the shifting direction and the selecting direction.

Here, an operation in the M position to which control by the control section 358 is related.

As the shift lever 310 moves from the H position to the M position, the shift lever 310 is held in the M position by the click member 312 and the detent member 352 constituting the shift lever holding mechanism.

In this state, the shift lever 310 becomes operable in the shifting direction, and is shifted up when moved to the positive direction and shifted down when moved to the negative direction.

When the driver turns an engine off in the manual state, that is, while the shift lever 310 is in the M position, the hall sensor 372 detects the position of the magnet 392. If the shift lever 310 is determined to remain in the M position (manual operational position), the control section 358 actuates the motor M to rotate the restricting member 356. Then, as the contact section 356b of the cam section 356a is brought into contact with the lever-side contact section 311c of the shift lever 310, the shift lever 310 is pushed to the H position, and the shift lever 310 returns to the H position.

If the hall sensor 373 detects that the cam section 356a reaches the restricting position, the control section 358 stops driving of the motor M, and stops the restricting member 356 at the position at which the contact section 356b faces against the lever-side contact section 311c.

With this, movement to the M position is restricted by the contact section 356b of the restricting member 356 unless the engine starts again and the shift lever 310 is moved to the driving position (D) or the reverse position (R).

When it is detected that the shift lever 310 has been moved to the D position (driving position) or to the R position (reverse position) after the engine starts, the control section 358 again actuates the motor M to move the contact section 356b to a position at which the contact section 356b does not face against the lever-side contact section 311c. With this, the restriction of the movement of the shift lever 310 to the M position is released, and the shift lever 310 is allowed to move to the M position.

As described above, according to the third embodiment, the rotational center shaft (the shaft 355) of the restricting member 356 is disposed so as to be parallel to the shift lever 310 in the H position. With this, the hall sensor (third detector member) 373 for detecting the position of the restricting member 356 and the hall sensor (first detector member) 371 and the hall sensor (second detector member) 372 for detecting the swing direction of the shift lever 310 may be mounted on the same surface of the circuit board 370. Thus, with the shifting device 3 according to this embodiment, in addition to the effects similarly to the first embodiment, it is possible to determine whether or not the movement of the shift lever 310 is restricted, to cause the shift lever 310 automatically return to the H position, and to reduce its size even with the above further functions.

Modified Example

The present invention is not limited to the embodiments described above, and it is possible to make various modifications and alterations, which are also included within the scope of the present invention.

For example, in the second embodiment, the example in which the discharge section 239 guides and discharges a foreign matter downward and outside through the casing 240. The present invention is not limited to such an example, and the discharge section may be configured so as to discharge a foreign matter outside the casing, and the discharge route for discharging foreign matters may be altered as appropriate.

While the first embodiment to the third embodiment as well as the modified example may be combined as appropriate, detailed description of such combinations are omitted. Further, the present invention is not limited to the embodiments described above.

REFERENCE SIGNS LIST

1: shifting device
10: shift lever
11: ball section
11a: engagement groove
11b: engagement groove
12: click member
20: guide member
21: guide groove
22: hook section
30: base member
31: concave section
32: container opening
33: container section
34: first pivotally-supporting section
34a: cut-out opening
35: second pivotally-supporting section
35a: cut-out opening
36: holding plate
40: casing
41: ball containing section
42: elastic claw section
42a: catching section
43: through hole
50: guide case
51: click groove
52: guide groove
53: shaft
60: guide cover
61: round hole
70: circuit board
71: hall sensor
72: hall sensor
80: rotor member
80a: shaft section 81: engagement piece
82: magnet
90: lever member
90a: shaft section
90b: arm section
91: engagement piece
92: magnet
2: shifting device
210: shift lever
211: ball section
211a: engagement groove
211b: engagement groove
212: click member
212a: bias member
212b: contact pin
213: guide cover
214: knob
220: bezel
221: through hole
222: hook section
230: base member
231: concave section
232: container opening
233: container section
234: first pivotally-supporting section
235: second pivotally-supporting section
236: convex section
237: through hole
238: wall section
239: discharge section
240: casing
250: guide case
251: click groove
252: guide groove
253: shaft
254: push nut
260: holder
270: circuit board
271: hall sensor
272: hall sensor
280: rotor member
280a: shaft section
281: engagement piece
282: magnet
290: lever member
290a: shaft section
290b: arm section
291: engagement piece
292: magnet
3: shifting device
310: shift lever
311: ball section
311a: engagement groove
311b: engagement groove
311c: lever-side contact section
312: click member
312a: bias member
312b: contact pin
320: bezel
321: through hole
330: base member
333: container section
340: casing
350: shift lever restricting mechanism
351: gear base member
352: detent member
352a: click groove
352b: click groove
352c: guide groove
353: worm
354: transmission gear
354a: worm wheel
354b: gear section
354c: gear shaft
355: shaft
356: restricting member
356a: cam section
356b: contact section
356c: magnet
356d: magnet
357: restricting gear
358: control section
370: circuit board
371: hall sensor
372 (372a, 372b): hall sensor
373: hall sensor
380: rotor member
381: engagement piece
382: magnet
390: lever member
390b: arm section
391: engagement piece
392: magnet
M: motor

What is claimed is:

1. A shifting device comprising:
a shift lever configured to be operated from a neutral position to a plurality of operational positions;
a guide member having a guide groove for guiding the shift lever to the plurality of operational positions;
a circuit board having a detector member arranged thereon, the detector member being for detecting a swing direction of the shift lever; and
a shift lever restricting mechanism configured to restrict the shift lever, under a predetermined condition, from moving to a predetermined operational position, and further comprising:
a first detection target member configured to change a position following swinging of the shift lever in a first swing direction;
a second detection target member configured to change a position following swinging of the shift lever in a second swing direction;
a restricting member provided for the shift lever restricting mechanism, and configured to change a position between a shift-restricting position and a released position; and
a third detection target member configured to change a position following an operation of the restricting member, wherein
the detector member includes:
a first detector member mounted on the circuit board, and facing against a detection target section of the first detection target member; and
a second detector member mounted on a surface of the circuit board, and facing against a detection target section of the second detection target member, the surface being identical to a surface on which the first detector member is mounted, and further includes:
a third detector member mounted on a surface of the circuit board, and facing against a detection target section of the third detection target member, the surface being identical to the surface on which the first detector member is mounted.

2. The shifting device according to claim 1, comprising:

an actuator configured to drive the shift lever restricting mechanism;

a control section configured to control the actuator; and, a shift lever holding mechanism configured to hold the shift lever in a manual operation position when the shift lever is operated from the neutral position to the manual operation, wherein the restricting member includes a contact section configured to be brought into contact with the shift lever and to release the shift lever from a holding state by the shift lever holding mechanism, the contact section being brought into contact with the shift lever by actuation of the actuator by the control section under a condition that a predetermined condition is satisfied when the shift lever is in the manual operation position, to change the position of the restricting member.

3. The shifting device according to claim 2, wherein
the restricting member includes an arc shaped cam section provided rotatably about and integrally with a rotational shaft parallel to the shift lever when the shift lever is in the neutral position, the cam section being eccentric with respect to the rotational shaft and having the contact section.

4. The shifting device according to claim 3, wherein
if the control section determines that a vehicle satisfies a predetermined shift-restriction condition when the shift lever is in the manual operation position, the control section controls the actuator such that, by actuating the actuator to drive the restricting member to bring the cam section into contact with the shift lever, the shift lever is released from the holding state by the shift lever holding mechanism and the restricting member is held in the shift-restricting position at which the shift lever is prevented from moving from the neutral position to the manual operation position.

\* \* \* \* \*